(12) United States Patent
Sieradzki et al.

(10) Patent No.: US 9,260,577 B2
(45) Date of Patent: Feb. 16, 2016

(54) CROSSLINKED POLYOLEFIN FOAM SHEET WITH EXCEPTIONAL SOFTNESS, HAPTICS, MOLDABILITY, THERMAL STABILITY AND SHEAR STRENGTH

(75) Inventors: Pawel Sieradzki, Cross Junction, VA (US); Jesse J. Baldwin, Strasburg, VA (US); Jeffrey S. Lippy, Winchester, VA (US)

(73) Assignee: Toray Plastics (America), Inc. (JP)

( * ) Notice: Subject to any disclaimer, the term of this patent is extended or adjusted under 35 U.S.C. 154(b) by 628 days.

(21) Appl. No.: 12/836,207

(22) Filed: Jul. 14, 2010

(65) Prior Publication Data

US 2011/0014835 A1 Jan. 20, 2011

Related U.S. Application Data

(60) Provisional application No. 61/259,901, filed on Nov. 10, 2009, provisional application No. 61/225,405, filed on Jul. 14, 2009.

(51) Int. Cl.
| | |
|---|---|
| *B32B 3/26* | (2006.01) |
| *B32B 5/18* | (2006.01) |
| *C08J 9/00* | (2006.01) |
| *B32B 9/04* | (2006.01) |
| *B32B 5/24* | (2006.01) |

(52) U.S. Cl.
CPC .............. *C08J 9/0061* (2013.01); *B32B 5/245* (2013.01); *B32B 9/046* (2013.01); *C08J 2323/10* (2013.01); *C08J 2423/00* (2013.01); *C08J 2453/00* (2013.01); *Y10T 428/249976* (2015.04); *Y10T 442/2139* (2015.04)

(58) Field of Classification Search
None
See application file for complete search history.

(56) References Cited

U.S. PATENT DOCUMENTS

| | | | |
|---|---|---|---|
| 4,146,598 | A | 3/1979 | Coyne |
| 4,946,871 | A | 8/1990 | Brichta et al. |
| 4,959,397 | A | 9/1990 | Brichta et al. |
| 4,980,110 | A | 12/1990 | Nelson et al. |
| 5,254,402 | A | 10/1993 | Okubo et al. |
| 5,273,702 | A | 12/1993 | Nelson et al. |
| 5,728,744 | A | 3/1998 | Okada et al. |
| 5,763,501 | A | 6/1998 | Bickhardt et al. |
| 5,786,403 | A | 7/1998 | Okada et al. |
| 5,844,009 | A | 12/1998 | Hurley et al. |
| 5,910,358 | A | 6/1999 | Thoen et al. |
| 6,054,005 | A | 4/2000 | Hurley et al. |
| 6,251,319 | B1 | 6/2001 | Tusim et al. |
| 6,350,512 | B1 | 2/2002 | Hurley et al. |
| 6,414,047 | B1 | 7/2002 | Abe |

(Continued)

FOREIGN PATENT DOCUMENTS

| | | |
|---|---|---|
| DE | 195 48 681 A1 | 6/1997 |
| EP | 0 331 447 A2 | 9/1989 |

(Continued)

OTHER PUBLICATIONS

Doba, J., "Dow Chemical Divisions Unveil Products," *Plastic News*, Dec. 4, 2000, issue 40, vol. 12, 2 pages.

(Continued)

*Primary Examiner* — Chinessa Adkins
(74) *Attorney, Agent, or Firm* — DLA Piper LLP (US)

(57) ABSTRACT

A crosslinked, closed cell polyolefin foam sheet has exceptional softness, haptics, moldability, thermal stability and shear strength as well as a laminate and uses thereof.

41 Claims, 7 Drawing Sheets

(56) References Cited

U.S. PATENT DOCUMENTS

| | | | |
|---|---|---|---|
| 6,440,241 B1* | 8/2002 | Mason et al. | 156/78 |
| 6,583,193 B2 | 6/2003 | Park et al. | |
| 6,590,006 B2 | 7/2003 | Park et al. | |
| 6,608,116 B2 | 8/2003 | Symons et al. | |
| 6,617,366 B2 | 9/2003 | Sueda et al. | |
| 6,653,360 B2 | 11/2003 | Gupta | |
| 6,764,756 B1 | 7/2004 | Ramesh | |
| 6,986,941 B2 | 1/2006 | Morita et al. | |
| 7,189,763 B2 | 3/2007 | Sueda et al. | |
| 7,189,764 B2 | 3/2007 | Sueda et al. | |
| 7,226,955 B2 | 6/2007 | Subramonian et al. | |
| 2002/0151611 A1* | 10/2002 | Thoen et al. | 521/142 |
| 2002/0177659 A1* | 11/2002 | Morikawa et al. | 525/88 |
| 2003/0013778 A1 | 1/2003 | Sueda et al. | |
| 2003/0207953 A1 | 11/2003 | Sueda et al. | |
| 2003/0232210 A1 | 12/2003 | Haas et al. | |
| 2005/0032923 A1* | 2/2005 | Oka et al. | 521/50 |
| 2005/0288442 A1 | 12/2005 | Chou et al. | |
| 2006/0078745 A1* | 4/2006 | Pudleiner et al. | 428/423.1 |
| 2006/0199872 A1* | 9/2006 | Prieto et al. | 521/142 |
| 2006/0205833 A1 | 9/2006 | Martinez et al. | |
| 2007/0082962 A1 | 4/2007 | Kusakawa et al. | |
| 2007/0219334 A1* | 9/2007 | Li Pi Shan et al. | 526/348 |
| 2008/0003421 A1* | 1/2008 | Matsumura et al. | 428/219 |
| 2008/0076844 A1 | 3/2008 | Van Sumeren et al. | |
| 2008/0269412 A1* | 10/2008 | Carnahan et al. | 525/53 |
| 2009/0023826 A1* | 1/2009 | Nishimura et al. | 521/139 |

FOREIGN PATENT DOCUMENTS

| | | |
|---|---|---|
| EP | 0 425 695 A1 | 5/1991 |
| EP | 0 434 411 A1 | 6/1991 |
| EP | 0 488 762 A2 | 6/1992 |
| EP | 0 726 290 A1 | 8/1996 |
| EP | 0 780 297 A2 | 6/1997 |
| EP | 0 803 530 A2 | 10/1997 |
| EP | 0 972 727 A1 | 1/2000 |
| EP | 0 991 514 B1 | 4/2000 |
| EP | 0 997 493 A1 | 5/2000 |
| EP | 1 082 381 B1 | 3/2001 |
| EP | 1 153 068 B1 | 11/2001 |
| EP | 1 388 570 A2 | 2/2004 |
| EP | 00790273 A2 | 7/2004 |
| EP | 00930323 B1 | 7/2004 |
| EP | 1 645 589 A1 | 4/2006 |
| EP | 1 752 485 A1 | 2/2007 |
| GB | 2 424 224 A | 9/2006 |
| JP | 56-112940 A | 9/1981 |
| JP | 57-202327 A | 12/1982 |
| JP | 59062641 A | 4/1984 |
| JP | 59071338 A | 4/1984 |
| JP | 59-115340 A | 7/1984 |
| JP | 60-124632 A | 7/1985 |
| JP | 61083236 A | 4/1986 |
| JP | 61083237 A | 4/1986 |
| JP | 61-188430 A | 8/1986 |
| JP | 61-188431 A | 8/1986 |
| JP | 61-188432 A | 8/1986 |
| JP | 61-238830 A | 10/1986 |
| JP | 61-238831 A | 10/1986 |
| JP | 61-238832 A | 10/1986 |
| JP | 62-184032 A | 8/1987 |
| JP | 62-184033 A | 8/1987 |
| JP | 62-190235 A | 8/1987 |
| JP | 62-214923 A | 9/1987 |
| JP | 62-250039 A | 10/1987 |
| JP | 62-256842 A | 11/1987 |
| JP | 63019232 A | 1/1988 |
| JP | 63-145344 A | 6/1988 |
| JP | 63-175041 A | 7/1988 |
| JP | 01026692 A | 1/1989 |
| JP | 1-190735 A | 7/1989 |
| JP | 1-222929 A | 9/1989 |
| JP | 1-240538 A | 9/1989 |
| JP | 1-259936 A | 10/1989 |
| JP | 1-272640 A | 10/1989 |
| JP | 2067129 A | 3/1990 |
| JP | 02092937 A | 4/1990 |
| JP | 2-182427 A | 7/1990 |
| JP | 2-185429 A | 7/1990 |
| JP | 2-255739 A | 10/1990 |
| JP | 2-258247 A | 10/1990 |
| JP | 3062832 A | 3/1991 |
| JP | 3-109444 A | 5/1991 |
| JP | 3-200844 A | 9/1991 |
| JP | 04013737 A | 1/1992 |
| JP | 04015234 A | 1/1992 |
| JP | 04063844 A | 2/1992 |
| JP | 4-122628 A | 4/1992 |
| JP | 4-122629 A | 4/1992 |
| JP | 4-278340 A | 10/1992 |
| JP | 4-311467 A | 11/1992 |
| JP | 4-312840 A | 11/1992 |
| JP | 4-371826 A | 12/1992 |
| JP | 05004269 A | 1/1993 |
| JP | 05004288 A | 1/1993 |
| JP | 05009324 A | 1/1993 |
| JP | 05016257 A | 1/1993 |
| JP | 05-42611 A | 2/1993 |
| JP | 05024126 A | 2/1993 |
| JP | 05-57808 A | 3/1993 |
| JP | 05-116224 A | 5/1993 |
| JP | 5-124037 A | 5/1993 |
| JP | 05-237949 A | 9/1993 |
| JP | 05-254035 A | 10/1993 |
| JP | 5-320399 A | 12/1993 |
| JP | 06-143401 A | 5/1994 |
| JP | 06-166767 A | 6/1994 |
| JP | 06-172575 A | 6/1994 |
| JP | 06170963 A | 6/1994 |
| JP | 06-256553 A | 9/1994 |
| JP | 06-297618 A | 10/1994 |
| JP | 06-340761 A | 12/1994 |
| JP | 06340762 A | 12/1994 |
| JP | 07018108 A | 1/1995 |
| JP | 07018109 A | 1/1995 |
| JP | 07033897 A | 2/1995 |
| JP | 07041589 A | 2/1995 |
| JP | 07-102100 A | 4/1995 |
| JP | 07-102101 A | 4/1995 |
| JP | 07-145259 A | 6/1995 |
| JP | 07-179641 A | 7/1995 |
| JP | 7-216123 A | 8/1995 |
| JP | 7-242762 A | 9/1995 |
| JP | 7-299832 A | 11/1995 |
| JP | 7-329093 A | 12/1995 |
| JP | 8-104765 A | 4/1996 |
| JP | 8-193142 A | 7/1996 |
| JP | 8-193143 A | 7/1996 |
| JP | 8-197664 A | 8/1996 |
| JP | 8-198993 A | 8/1996 |
| JP | 8-198994 A | 8/1996 |
| JP | 8-239501 A | 9/1996 |
| JP | 8-239632 A | 9/1996 |
| JP | 8-302053 A | 11/1996 |
| JP | 8-302054 A | 11/1996 |
| JP | 8-309902 A | 11/1996 |
| JP | 8-325402 A | 12/1996 |
| JP | 8-325403 A | 12/1996 |
| JP | 8-325404 A | 12/1996 |
| JP | 09012762 A | 1/1997 |
| JP | 09019978 A | 1/1997 |
| JP | 9-123263 A | 5/1997 |
| JP | 09-132662 A | 5/1997 |
| JP | 9-151266 A | 6/1997 |
| JP | 9-151268 A | 6/1997 |
| JP | 9-286066 A | 11/1997 |
| JP | 9-300381 A | 11/1997 |
| JP | 9-300508 A | 11/1997 |
| JP | 09-324063 A | 12/1997 |
| JP | 10016105 A | 1/1998 |
| JP | 10044283 A | 2/1998 |
| JP | 10-114033 A | 5/1998 |

(56) References Cited

FOREIGN PATENT DOCUMENTS

| | | |
|---|---|---|
| JP | 10-138350 A | 5/1998 |
| JP | 10-166425 A | 6/1998 |
| JP | 10-195223 A | 7/1998 |
| JP | 10-316796 A | 12/1998 |
| JP | 11-20061 A | 1/1999 |
| JP | 11-21365 A | 1/1999 |
| JP | 11-58640 A | 3/1999 |
| JP | 11-138712 A | 5/1999 |
| JP | 11-228721 A | 8/1999 |
| JP | 11-228725 A | 8/1999 |
| JP | 11-236463 A | 8/1999 |
| JP | 11-255936 A | 9/1999 |
| JP | 11-279315 A | 10/1999 |
| JP | 11-293018 A | 10/1999 |
| JP | 11-300840 A | 11/1999 |
| JP | 11-315161 A | 11/1999 |
| JP | 2000-7814 A | 1/2000 |
| JP | 2000-103895 A | 4/2000 |
| JP | 2000-103896 A | 4/2000 |
| JP | 2000-109588 A | 4/2000 |
| JP | 2000-198889 A | 7/2000 |
| JP | 2000-317418 A | 11/2000 |
| JP | 2000-344924 A | 12/2000 |
| JP | 2000-351865 A | 12/2000 |
| JP | 01240693 A | 9/2001 |
| JP | 01294699 A | 10/2001 |
| JP | 01347617 A | 12/2001 |
| JP | 02003631 A | 1/2002 |
| JP | 02036337 A | 2/2002 |
| JP | 02047371 A | 2/2002 |
| JP | 02160251 A | 6/2002 |
| JP | 02275297 A | 9/2002 |
| JP | 02332370 A | 11/2002 |
| JP | 02347113 A | 12/2002 |
| JP | 03026840 A | 1/2003 |
| JP | 03026842 A | 1/2003 |
| JP | 03073493 A | 3/2003 |
| JP | 03082142 A | 3/2003 |
| JP | 03105117 A | 4/2003 |
| JP | 03128826 A | 5/2003 |
| JP | 03201359 A | 7/2003 |
| JP | 03211471 A | 7/2003 |
| JP | 03334880 A | 11/2003 |
| JP | 04018575 A | 1/2004 |
| JP | 04027239 A | 1/2004 |
| JP | 04074653 A | 3/2004 |
| JP | 04090531 A | 3/2004 |
| JP | 04204154 A | 7/2004 |
| JP | 04262983 A | 9/2004 |
| JP | 04291372 A | 10/2004 |
| JP | 04323842 A | 11/2004 |
| JP | 05008788 A | 1/2005 |
| JP | 5-200472 A | 7/2005 |
| JP | 2005-200475 A | 7/2005 |
| JP | 05200473 A | 7/2005 |
| JP | 06052262 A | 2/2006 |
| JP | 06070206 A | 3/2006 |
| JP | 06143786 A | 6/2006 |
| JP | 06169404 A | 6/2006 |
| JP | 06169405 A | 6/2006 |
| JP | 06183025 A | 7/2006 |
| JP | 06-265341 A | 10/2006 |
| JP | 06265341 A | 10/2006 |
| JP | 06-307069 A | 11/2006 |
| JP | 06307069 A | 11/2006 |
| WO | 90/14385 A1 | 11/1990 |
| WO | 98/20197 A1 | 5/1998 |
| WO | 02/20658 A1 | 3/2002 |
| WO | 2004/016678 A2 | 2/2004 |
| WO | 2004/078832 A1 | 9/2004 |
| WO | 2005/007731 A1 | 1/2005 |
| WO | 2006/043570 A1 | 4/2006 |
| WO | 2006/048333 A1 | 5/2006 |
| WO | 2008/097952 A1 | 8/2008 |
| WO | 2008/100501 A2 | 8/2008 |
| WO | 2008/100842 A1 | 8/2008 |

OTHER PUBLICATIONS

"Thin Polyolefin Foam: from Alveo, Switzerland," *Kunststofen Rubber*, Aug. 13, 2001, vol. 54, No. 8, p. 11 (summary only in English—1 sheet).

"Novel Technologies Boost Performance Profile of Polyolefin Foams," *Modern Plastics International*, Mar. 31, 2000, vol. 30, No. 3, pp. 80 and 82 (summary only—1 sheet).

Sopher, S.R., "Advancements in Soft Polyolefin Bead Foams for Automotive Interior Trim Components," *SAE Transactions: Journal of Materials & Manufacturing*, 2005, vol. 113, section 5, pp. 788-795 (summary only—2 sheets).

"Montell Develops Improved TPOs for Profiles," *Plastics News*, Mar. 16, 1999 (summary only—1 sheet).

Shah, S., "An Overview of Innovative Technologies Based on 2005 Automotive Innovation Awards," *SPE*, 2006, vol. 012, pp. 10-21 (summary only—1 sheet).

"Soft-Touch Olefin Skin Laminate is Recyclable," *Plastics Technology*, 2006, vol. 52, No. 2, p. 19 (summary only—1 sheet).

Willemse, R., "Soft Materials with Fine Cells Using Chemical Blowing Agents," *Shawbury, Rapra Technology Ltd.*, conference held in Hamburg, Germany, May 10-11, 2004 (summary only—1 sheet).

Alveo AG, "Extremely Thin, Crosslinked Polyolefin Foam," *Messe Duesseldorf*, (Directory of Conference K2001: Product Information), 2001, p. 80 (summary only—1 sheet).

Reade, L. et al., "Foam Improvements," *European Plastics News*, 2001, vol. 28, No. 8, p. 60 (summary only—sheet).

"Volara-Minicel—Volextra. Closed Cell Foam Solutions" (Trade Name Record), Lawrence, Ma., 1900, p. 2 (summary only—1 sheet).

Voltek, "Volara-Minicel—Volextra. Closed Cell Foam Solutions", Lawrence. Ma., 1900, p. 2 (summary only—1 sheet).

"Investment Backs Alveo Expansion Aim," *Plast. Rubb.Wkly.*, 1997, No. 1696, p. 4 (summary only—1 sheet).

Zotefoams Plc, "Zotefoams Product Guide," *Croydon*, 1995, p. 4 (summary only—1 sheet).

Puri, R.R. et al., "The Production of Cellular Crosslinked Polyolefins," *Cell. Polym.*, 1988, vol. 7, No. 1, pp. 56-84 (summary only—sheet).

Galli, E., "Thermoforming XLPE Foams," *Plast. Des. Forum*, Mar.-Apr. 1987, vol. 12, No. 2, pp. 73-76 (summary only—1 sheet).

Kemmotsu, T., "Improvements of the Surface of Polyethylene Foamed Sheet by Irradiation," *China Nuclear Information Centre*, Report No. Conf. 920909, Subfile Code: INIS, 1992, p. 10 (description only—2 sheets).

Lee, P.C. et al., "Extrusion of Microcellular Open-Cell LDPE-Based Sheet Foams," *Journal of Applied Polymer Science*, 2006, vol. 102, No. 4, p. 3376 (summary only—1 sheet).

Rodriguez-Perez, M.A. et al., "Characterisation of the Matrix Polymer Morphology of Polyolefins Foams by Raman Spectroscopy," *Polymer*, 2005, vol. 46, No. 26, pp. 12093-12102 (summary only—1 sheet).

Schut, J.H., "Strategies—Focused on Foam," *Plastics Technology*, 2003, vol. 49, No. 7, p. 80 (summary only—1 sheet).

Zotefoams PLC, "Propozote PPA Polypropylene Foam 30 KG M-3," *Croydon*, (Trade Literature), 1999, p. 2 (summary only—1 sheet).

Schut, J.H., "Foamed Films Find New Niches," *Plastics Technology*, 2002, vol. 48, No. 2, pp. 48-55 (summary only—1 sheet).

Lippel, N., "Developments of Chemical Blowing Agents (CBAs) for the Polyolefin Extrusion Process," *Lehmann & Voss & Co.*, Conference Paper, 1999, pp. 5-10 (summary only—1 sheet).

Smith, A., "Zotefoams to Double Output of Nitrogen Foamed Sheet," *Plastics Additives & Compounding*, 1900, vol. 2, No. 6, pp. 32-37 (summary only—1 sheet).

Zotefoams PLC, "Zotefoams' First Step to Doubling Capacity," *British Plastics and Rubber*, 1900, pp. 10-11 (summary only—1 sheet).

Mapleston, P., "Economical Process May Lure Entry-Level Manufacturers," *Modern Plastics International*, 1900, vol. 30, No. 4, pp. 36-37 (summary only—1 sheet).

(56) References Cited

OTHER PUBLICATIONS

Zotefoams Ltd., "Pure PP In Zotefoams Family," *Plastics and Rubber Weekly*, 1999, No. 1801, p. 7 (summary only—1 sheet).

Fritz, H.G. et al., "Generation of Partially Crosslinked Expanded PP Films and Sheets," *Int. Polym. Processing*, 1998, vol. 13, No. 2, pp. 129-135 (summary only—1 sheet).

Zotefoams Ltd., "Zotefoams Plans Higher Performance Foam Grades," *Brit. Plast. Rubb.*, 1997, p. 46 (summary only—1 sheet).

Callari, J., "Foamed PP Sheet Targets PVC Padding Applications," *Plast. World*, 1996, vol. 54, No. 12, p. 22 (summary only—1 sheet).

Park, C.P., "Polyolefin Foam," *Polymer Technologies Inc.*, Handbook of Polymeric Foams and Foam Technology, Book Chapter, 1991, pp. 187-242 (summary only—1 sheet).

Zotefoams Ltd., "Plastazote Low Density Polyethylene Foam Static Dissipative Grade," *Croydon*, Trade Literature, 1993, p. 2 (summary only—1 sheet).

Zotefoams Ltd., "Zotefoams Health Care Applications," *Croydon*, 1995, p. 8 (summary only—1 sheet).

Zotefoams Plc, "Zotefoams, Introduction and Selection Guide," *Croydon*, Trade Literature, 1995, p. 8 (summary only—1 sheet).

Zotefoams Plc, "Zotefoams. Technical Information," *Croydon*, Trade Literature, 1995, p. 42 (summary only—1 sheet).

Alveo AG, "Alveolit Closed Cell, Physically Crosslinked Polyolefin Foam," *Luzern*, Trade Literature, 1992, p. 20 (summary only—1 sheet).

Toray Industries Inc., "New Polyolefin Foam," *Plast. Ind. News* (Jap.), Journal, 1990, vol. 36, No. 3, pp. 36-37—(summary only—1 sheet).

Mapleston, P., "Polyolefin Foams Are Set to Take on More Performance Jobs," *Mod. plast. Int.*, 1998, vol. 18, No. 6, pp. 43-44 (summary only—1 sheet).

Dow Chemical Co., "Polyethylene Foam," *Plast. World*, Journal, 1987, vol. 45, No. 9, p. 85 (summary only—1 sheet).

Pilon Plastics Pty Ltd., "New Range of Polyethylene Foam Products Released," *Plast. News (Aust.)*, Journal, 1979, p. 25 (summary only—1 sheet).

Du Pont De Nemours E.I., & Co. Inc., "Big New Action in Polyolefin Foams," *Mod. Plast. Int.*, Journal, 1979, pp. 47-48 (summary only—1 sheet).

Retipolen Espansi Spa, "Prospects for Semi-Finished Products of Crosslinked Expanded Polyethylene," *Mat. Plast. Elast.*, 1977, No. 3, pp. 162-167 (summary only—English translation—1 sheet).

Bone, P.J., "Crosslinked Cellular Polyethylene—Production and Uses," *Polymers Paint and Colour Journal, Polyolefins and Abs in the 1980 and Beyond, Symposium, Guildford*, 1975, p. 11 (summary only—1 sheet).

"Polyolefin Foams," *Rev. Plast. Mod.*, 1974, vol. 28, No. 217, pp. 92-97 (summary only—English translation—1 sheet).

Wood, A.S., "New Options in Polyolefin Foams—Some You Can Make, Some You Can Buy," *Mod. Plast. Int.*, 1973, vol. 3, No. 6, pp. 58-61 (summary only—1 sheet).

Oda, E., "Problems of Crosslinking as a Practical Method of Modifying Polymers. II," *Jap. Plast.*, 1973, vol. 7, No. 1, pp. 11-18 (summary only—1 sheet).

Rado, R., "New Applications of Chemically Crosslinked Polyethylene," *Plast. Hmoty Kauc.*, 1973, vol. 10, No. 1, pp. 3-7 (summary only—1 sheet).

Patal, M. R., "Extrusion of Filled Conductive Foam Sheet," *University of Lowell*, Institution Code 0111, 1987, vol. 26-03, p. 349 (summary only—1 sheet).

\* cited by examiner

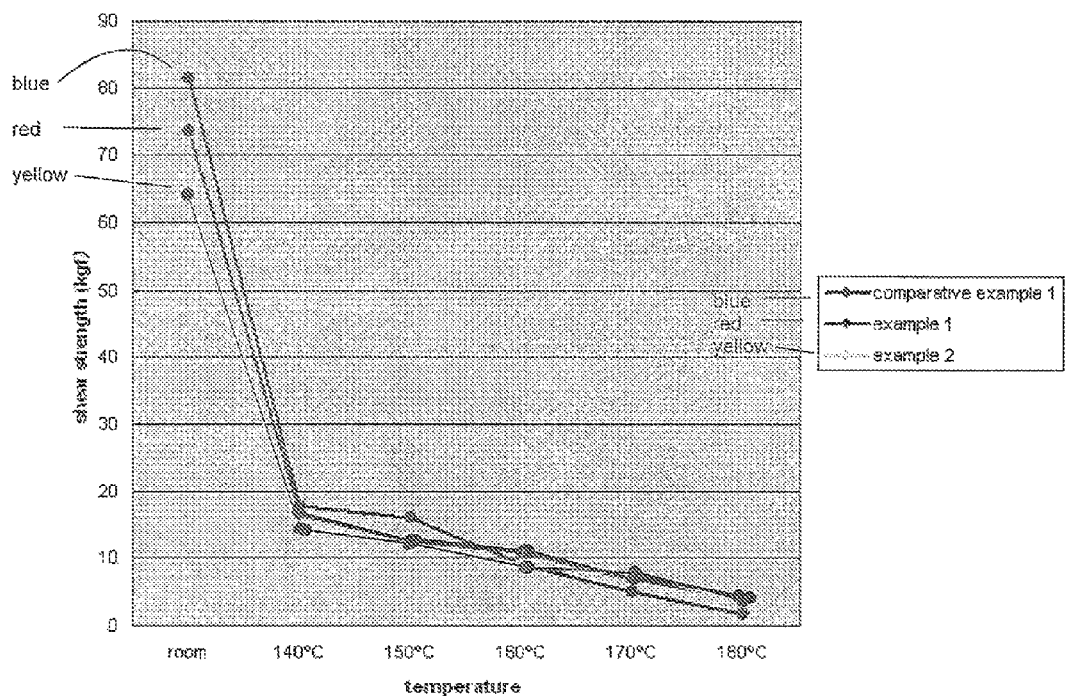

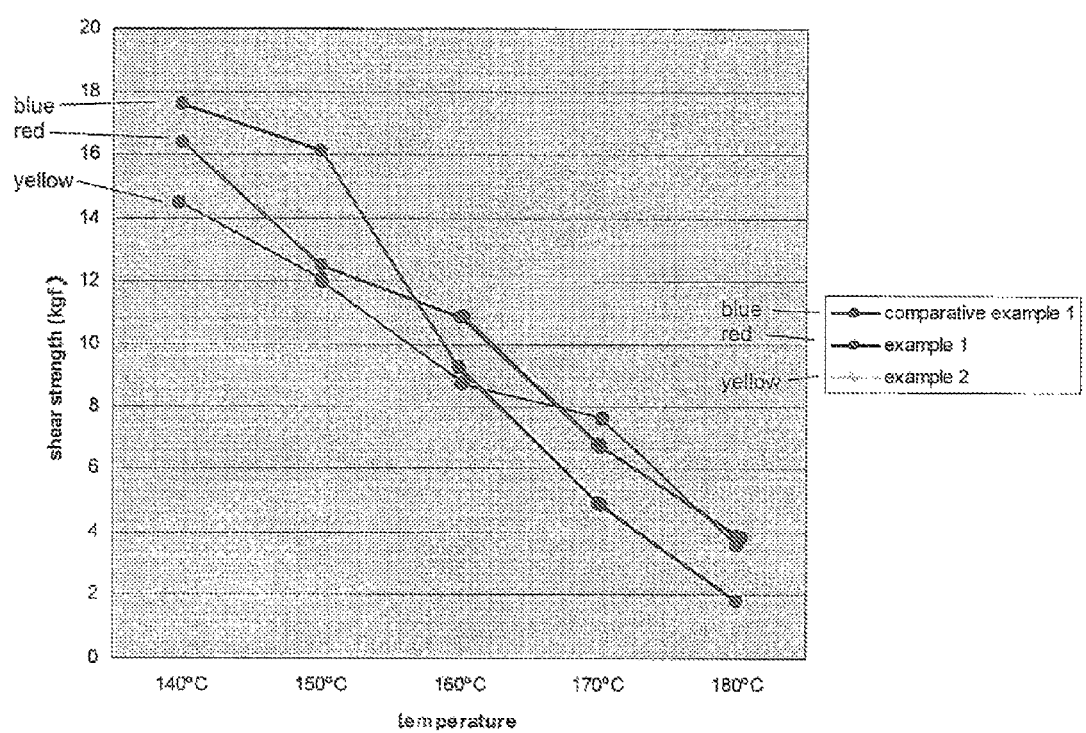

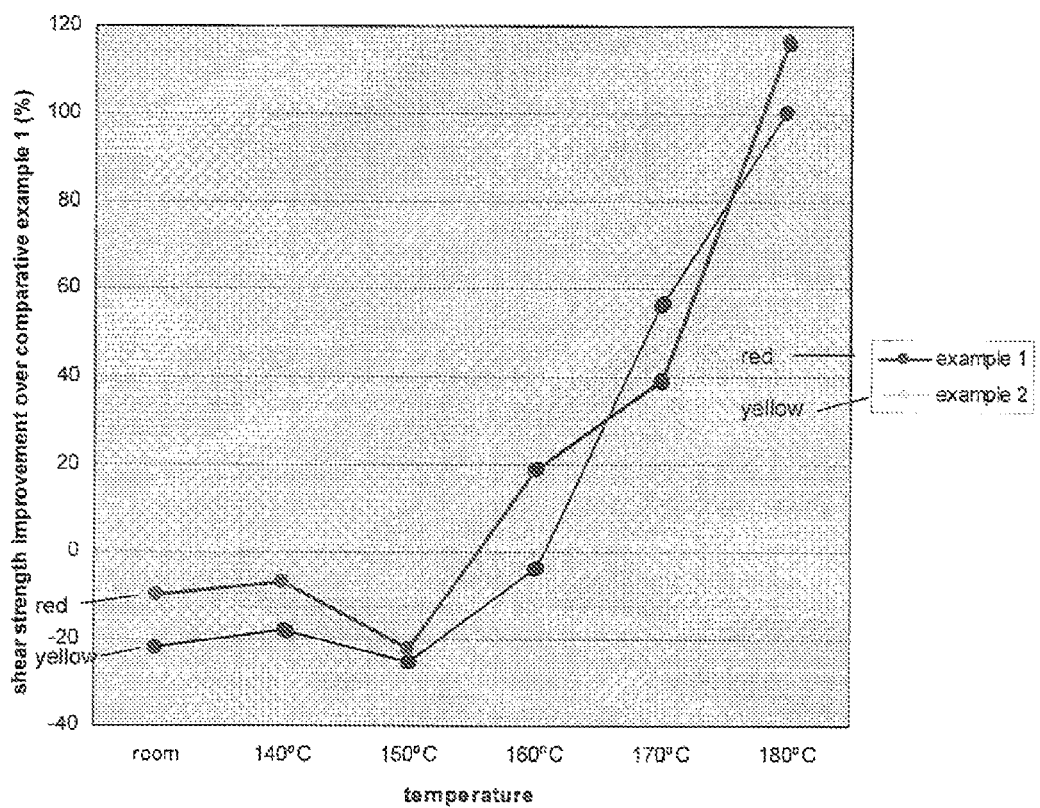

CROSSLINKED POLYOLEFIN FOAM SHEET WITH EXCEPTIONAL SOFTNESS, HAPTICS, MOLDABILITY, THERMAL STABILITY AND SHEAR STRENGTH

RELATED APPLICATIONS

The present application claims priority from U.S. Provisional Patent Application Nos. 61/259,901 filed Nov. 10, 2009 and 61/225,405 filed Jul. 14, 2009, the entire disclosures of which are incorporated by reference herein.

TECHNICAL FIELD

This disclosure relates to crosslinked olefin foams comprising a blend of olefin block copolymer (OBC) having a controlled block sequence and a polypropylene based material. More particularly, the disclosure relates to crosslinked olefin foam sheets which realize good softness, haptics, moldability, and are thermally stable or which have good haptics, moldability and exceptional shear strength. This combination of properties is unique for polyolefin based foams.

BACKGROUND

Closed cell polyolefin foams are commercially produced and used in various applications including automotive, furniture, gasketing, sealing and adhesives.

In these applications, a foam that is soft is often desirable. For example, in the case of an automotive door panel upper, a firm foam will not compress when an elbow is casually placed upon it. Hence, such a foam does not serve its primary purpose of providing a comfortable cushion for the elbow as it rests upon the panel. As a gasket for an electronic component, a firm foam will "push back" against a sensitive or flexible component and will consequently warp or damage that component.

A foam with good haptics is also desirable. Good haptics result in a pleasant soft touch "plush" or "rich" feel to the foam. It is especially desirable in any situation where the foam is being used to impart a feeling of comfort and softness to anyone contacting the foam. Good haptics result in a desirable soft touch feel that is measured by a lack of initial resistance to the gradual compressive displacement of a foam. We quantify such a desirable soft touch feel of a foam with a "haptic factor" which is described below. Intuitively, one would assume that the softer the foam, then the more of a soft touch feel the foam should have. However, foams that are equally soft are not necessarily haptically equivalent. Hence, the need to discuss "softness" and "haptics" as separate characteristics.

Additionally, thermally stable foams are needed in situations where a foam may become heated. Examples of such situations include heat laminating a skin or fabric to a foam; vacuum forming a foam laminate to a substrate; compression molding a foam laminate to a substrate; and end uses where the foam is exposed to constant or intermittent elevated temperatures. Importantly, thermally stable foams are suitable for more commercial applications and markets.

The moldability of a foam is critical in thermoforming processes such as vacuum, pressbond, compression, low pressure and other molding processes. During these molding processes, foams will elongate and bend under tension and the shear forces placed on the foam. The more the foam can elongate and withstand shear forces placed upon it when forming, the better its moldability. With increasing moldability, the foam will be capable of forming more complex shapes and deeper draws before ultimately tearing. Product designers and manufacturers desire foams with better moldability to allow them to create and produce part designs of ever increasing complexity and deeper draws. Importantly, a foam with better moldability can be lighter and still maintain functionality.

Additionally, foams with exceptional "shear strength" as described below are needed. Such foams are useful as mounting tapes where exceptional softness is necessary to ensure sufficient contact with irregular surfaces to be joined and where exceptional shear strength is also necessary. Foam with exceptional shear strength at elevated temperatures is also important in injection molding or low pressure injection molding applications.

Thus, a need exists for crosslinked olefin foams which solve the problem of sacrificing one of these five desired foam physical properties for another. Furthermore, there is a need for methods of making such foams.

SUMMARY

We thus provide a foam composition comprising about 15 to about 75 parts by weight of an olefin block copolymer with a controlled block sequence having a melt flow index from about 0.1 to about 15 gram per 10 minutes at 190° C. and a melting temperature of at least about 115° C.; about 25 to about 85 parts by weight of at least one polypropylene based polymer having a melt flow index from about 0.1 to about 25 gram per 10 minutes at 230° C.; crosslinks to a crosslinking degree of about 20 to about 75%; and closed cells; wherein the density of the foam composition is about 20 to about 250 kg/m$^3$.

We also provide a foam composition comprising an olefin block copolymer with a controlled block sequence having a melt flow index of about 0.75 to about 6.0 gram per 10 minutes at 190° C. and a melting temperature of about 120 to about 124° C.; at least one polypropylene based polymer having a melt flow index of about 1.3 to about 2.5 gram per 10 minutes at 230° C. and a melting temperature of about 137 to about 168° C.; crosslinks formed from about 2.95 to about 3.63 parts per hundred units resin of divinylbenzene crosslinker to a crosslinking degree of about 29 to about 47%; and closed cells; wherein the foam composition has a density of about 32 to about 83 kg/m$^3$, a compressive strength of about 0.27 to about 0.57 kg/cm$^2$, a durometer hardness of about 47 to about 64 Shore OO, a haptic factor of about 1.0 to about 2.8; a shrinkage value of about 1.7 to about 3.3% after 1 hour at 120° C., and a shrinkage value of about 3.4 to about 9.9% after 10 minutes at 140° C.

We also provide a foam composition made by a process comprising the steps of a) blending a composition comprising (i) about 15 to about 75 parts by weight of an olefin block copolymer with a controlled block sequence having a melt flow index of about 0.1 to about 15 grams per 10 minutes at 190° C. and a melting temperature of at least about 115° C., (ii) about 25 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 20 to about 75%; and c) foaming the crosslinked composition at an elevated temperature to obtain a foam composition having a density of about 20 to about 250 kg/m$^3$.

We further provide a method for making a foam composition comprising the steps of a) blending a composition comprising (i) about 15 to about 75 parts by weight of an olefin block copolymer with a controlled block sequence having a melt flow index of about 0.1 to about 15 grams per 10 minutes at 190° C. and a melting temperature of at least about 115° C., (ii) about 25 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 20 to about 75%; and c) foaming the crosslinked composition at an elevated temperature to obtain a foam composition having a density of about 20 to about 250 kg/m³.

We also provide a foam composition comprising about 15 to about 50 parts by weight of an olefin block copolymer with a controlled block sequence having a melt flow index from about 0.1 to about 15 gram per 10 minutes at 190° C. and a melting temperature of at least about 115° C.; about 50 to about 85 parts by weight of at least one polypropylene based polymer having a melt flow index from about 0.1 to about 25 gram per 10 minutes at 230° C.; crosslinks to a crosslinking degree of about 45 to about 75%; and closed cells; wherein the density of the foam composition is about 20 to about 250 kg/m³.

We further provide a foam composition comprising an olefin block copolymer with a controlled block sequence having a melt flow index of about 0.75 to about 1.25 gram per 10 minutes at 190° C. and a melting temperature of about 120 to about 122° C.; at least one polypropylene based polymer having a melt flow index of about 1.7 to about 2.5 gram per 10 minutes at 230° C. and a melting temperature of about 146 to about 148° C.; crosslinks formed from about 3.95 to about 4.05 parts per hundred units resin of divinylbenzene crosslinker to a crosslinking degree of about 55 to about 60%; and closed cells; wherein the foam composition has a density of about 66 to about 72 kg/m³, a compressive strength of about 0.77 to about 0.83 $kg_f/cm^2$, a durometer hardness of about 70 to about 73 Shore OO, a haptic factor of about 2.3 to about 2.5; a shrinkage value of about 1.6 to about 1.9% after 1 hour at 120° C., a shrinkage value of about 6.9 to about 8.3% after 10 minutes at 140° C., a shrinkage value of about 28.1 to about 28.6% after 10 minutes at 160° C., a shear strength of about 63.8 to about 73.5 $kg_f$ at about 60 to about 80° C., a shear strength of about 14.4 to about 16.4 $kg_f$ at 140° C., a shear strength of about 12.0 to about 12.5 $kg_f$ at 150° C., a shear strength of about 8.8 to about 10.9 $kg_f$ at 160° C., a shear strength of about 6.8 to about 7.6 $kg_f$ at 170° C. and a shear strength of about 3.6 to about 3.9 $kg_f$ at 180° C.

We also provide a foam composition made by a process comprising the steps of: a) blending a composition comprising (i) about 15 to about 50 parts by weight of an olefin block copolymer with a controlled block sequence having a melt flow index of about 0.1 to about 15 grams per 10 minutes at 190° C. and a melting temperature of at least about 115° C., (ii) about 5° to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 45 to about 75%; and c) foaming the crosslinked composition at an elevated temperature to obtain a foam composition having a density of about 20 to about 250 kg/m³.

We further provide a method for making a foam composition comprising the steps of: a) blending a composition comprising (i) about 15 to about 50 parts by weight of an olefin block copolymer with a controlled block sequence having a melt flow index of about 0.1 to about 15 grams per 10 minutes at 190° C. and a melting temperature of at least about 115° C., (ii) about 50 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 45 to about 75%; and c) foaming the crosslinked composition at an elevated temperature to obtain a foam composition having a density of about 20 to about 250 kg/m³.

BRIEF DESCRIPTION OF THE DRAWINGS

FIGS. 5a and 5b shows shear strength as a function of temperature for three closed cell polyolefin foams and contrasts the foams of Examples 1 and 2 in Table 4 having desirable shear strengths at higher temperatures with the foam of Comparative Example 1 in Table 5 having undesirable haptics but desirable shear strength at these temperatures.

FIG. 6 shows the percentage of shear strength improvement relative to the shear strength of the foam of Comparative Example 1 in Table 5 for the closed cell polyolefin foams of Examples 1 and 2 in Table 4 as a function of temperature.

DETAILED DESCRIPTION

It will be appreciated that the following description is intended to provide details concerning specific representative aspects of the disclosure. It will also be appreciated that a wide variety of equivalents may be substituted for the specified elements of the methods, compositions and systems described herein without departing from the spirit and scope of this disclosure as described in the appended claims. Additionally, all publications, including but not limited to patents and patent applications, cited in this disclosure are herein incorporated by reference as though fully set forth. Ranges identified herein (e.g., 20 to 75%) are intended to include the values defining the upper and lower limits of a recited range (e.g., 20 and 75%), all discrete values within the range (e.g., 21%, 21.1,%, 22%, etc.) and any discrete sub-range (e.g., 30% to 40%, 38% to 48% or 55% to 60%) within the range. Those of ordinary skill in the art will also recognize that, consistent with probability theory and statistics, in some instances compositions equivalent to those described here may have one or more properties which differ from the exact values recited herein due to normal variation which can be described by a Gaussian distribution. Such compositions have values which may be considered "about" a given value. Additionally, those of ordinary skill in the art will recognize that preparations of olefin block copolymers having a controlled block sequence distribution or polypropylene based polymers useful in the compositions or methods of the disclosure may contain small amounts of antioxidants, or other substances, which typically represent from 0% to 1% of the mass of such preparations. Consequently, one of ordinary skill in the art would recognize this when providing an amount of such a preparation that is "about" a particular value.

Certain of the properties in the disclosure are defined and measured according to the following descriptions.

"Compressive strength" is measured according to JIS K6767, where 50×50 mm precut foam is stacked to 25 mm and compressed at a rate of 10 mm/min to 75% of the original stacked height. The compression is then maintained for 20 seconds, after which the compressive strength is recorded.

Figure 1:
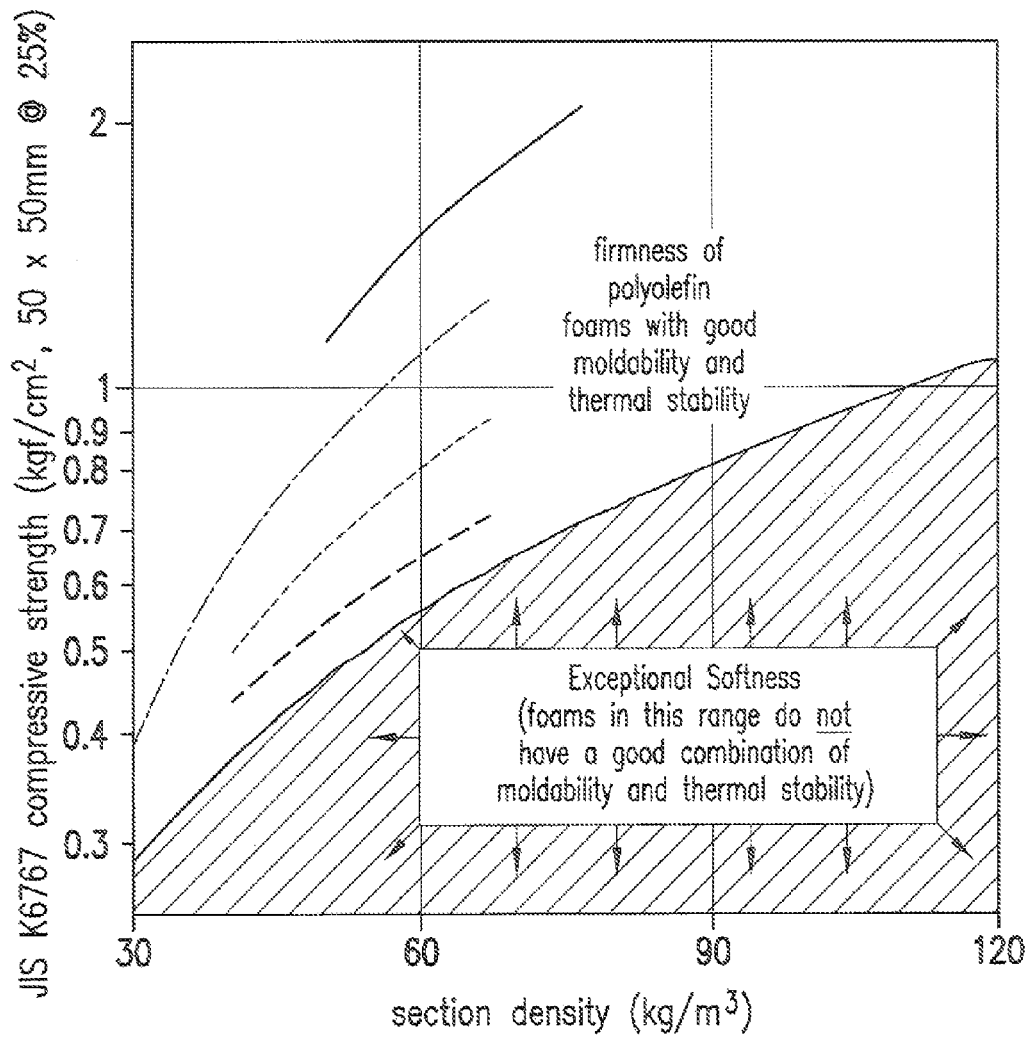
FIG. 1 shows a plot of compressive strength as a function of section density and contrasts compressive strength values for firm foam sheets having good moldability and good thermal stability with compressive strength values for exceptionally soft foam sheets lacking good moldability and lacking good thermal stability.

FIG. 1 presents a plot of the compressive strength of selected foam compositions as a function of density to help illustrate the softness or firmness of foam compositions having good moldability and good thermal stability.

"Durometer hardness" is measured according to ASTM D2240. Durometer hardness values can be expressed on the Shore OO and Shore A scales consistent with ASTM D2240. The higher the durometer hardness number, the greater the resistance of the foam to indentation. Durometer hardness values provide a measure of the firmness or softness of the foam sheet in the present disclosure. Shore OO scale values are measured with a Shore OO three spring-loaded indenter at 15 seconds of indentation and is a measure of the resistance of material to indentation by a three (3) spring-loaded indenter. The firmness or softness of the foam sheet can be expressed using a durometer hardness value on the Shore OO scale.

Figure 2:
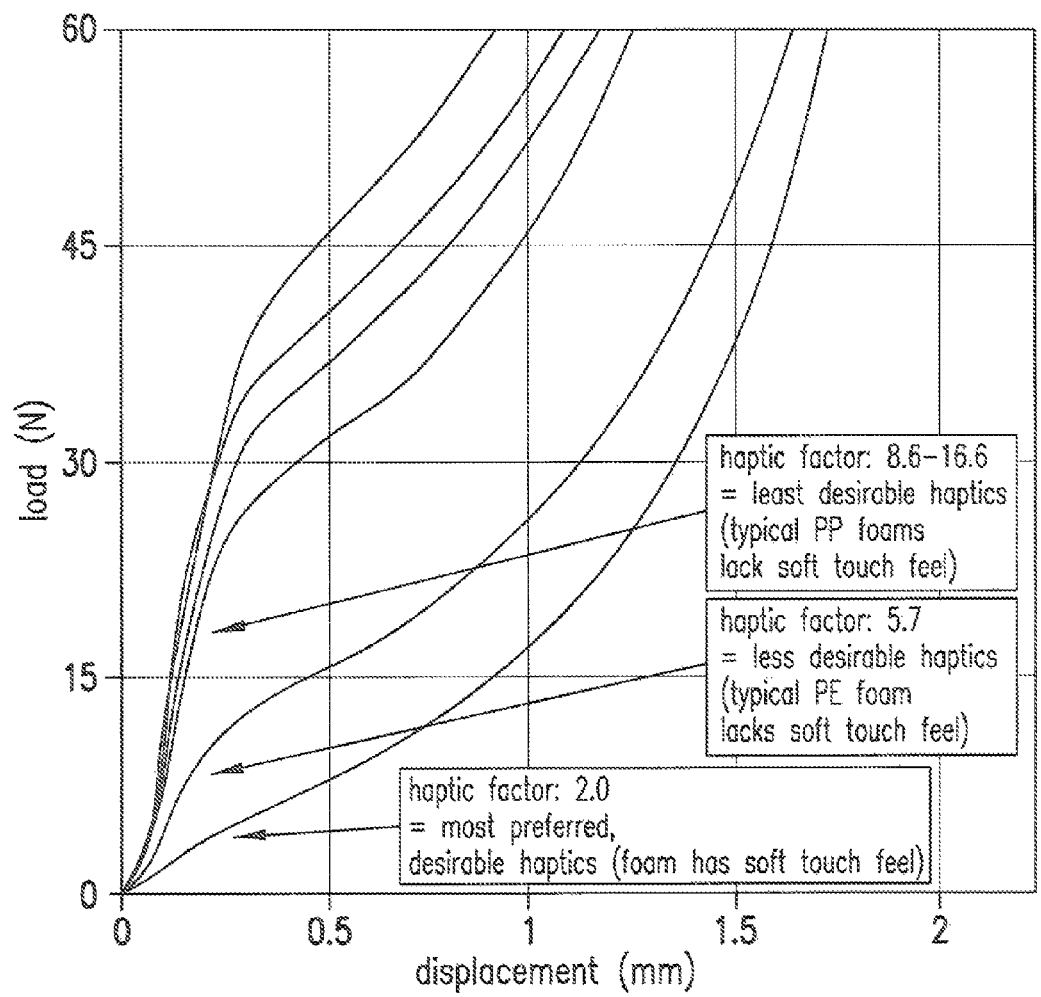
FIG. 2 shows haptic curve plots of load as a function of displacement for five closed cell polyolefin foams and contrasts foams having desirable haptic factor values with foams having undesirable haptic factor values.
Figure 3:
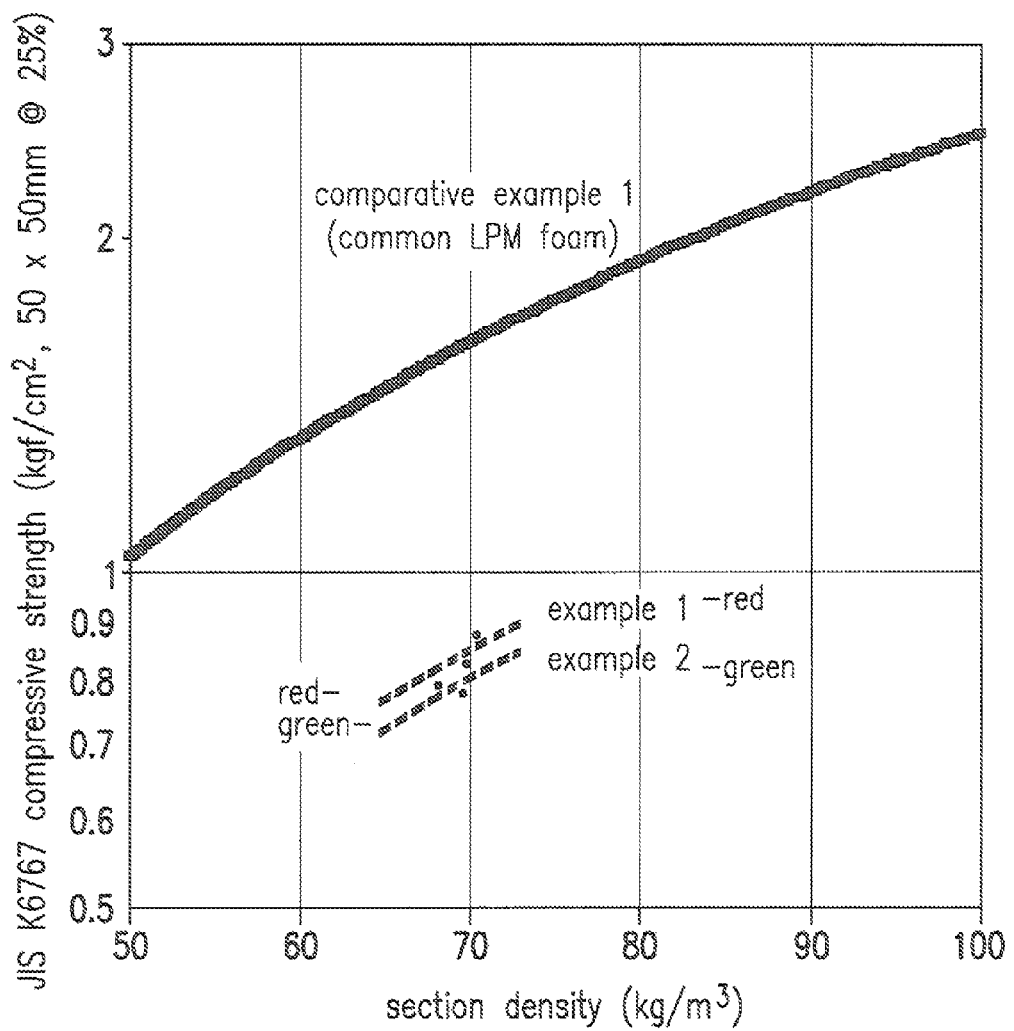
FIG. 3 shows a plot of compressive strength as a function of section density and contrasts compressive strength values for the foam sheets of Examples 1 and 2 in Table 4 having good moldability and good thermal stability with compressive strength values for the common closed cell polyolefin LPM foam of Comparative Example 1 in Table 5.
Figure 4:
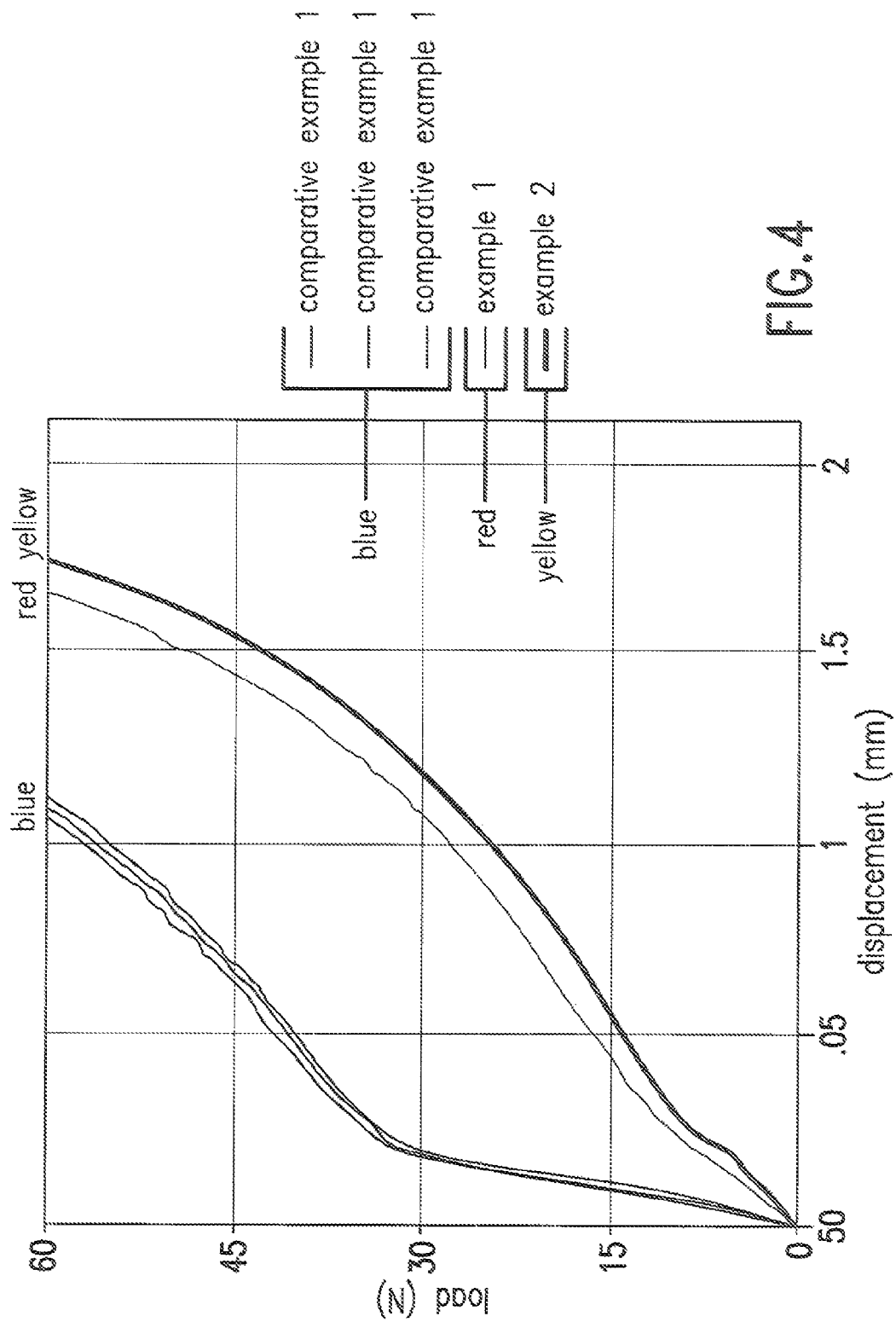
FIG. 4 shows haptic curve plots of load as a function of displacement for three closed cell polyolefin foams and contrasts the foams of Examples 1 and 2 in Table 4 having desirable haptic factor values with the foam of Comparative Example 1 in Table 5 having undesirable haptic factor values.

"Haptic factors" are measured as follows. Haptic plots, such as those shown in FIG. 2, are created by compressing an unstacked foam sheet according to VDA 237-101 section (annex) 1, where a 14 mm diameter flat indenter with 0.3 mm edge radius is used to compress the non-stacked foam sheet at a rate of 5 mm/min to at least 2.1 mm of compression or 60 N of load, whichever occurs first. Load versus compressive displacement is then graphed and visually evaluated.

The haptic factor quantifies the soft touch feel of a foam. It is found by determining two slopes on the haptics curve. One is the maximum slope of the load as a function of displacement, in the steep, or steeper, initial 10 to 15% displacement portion of the curve. The other is the portion of the haptics curve with the "flattest" or "smallest" slope in the haptics curve. Importantly, the maximum slope is divided by the minimum slope to obtain the haptic factor. A foam with a haptic factor of about 3.2 or less exhibits a desirable soft touch feel. A haptic factor of about 3.0 or less is preferred and a haptic factor of about 2.8 or less is more preferred.

If the graph shows an initial resistance to the gradual compressive displacement, the foam sheet is said to have poor haptics. That is, the foam sheet does not have a desired soft touch feel. If the graph shows no initial resistance to gradual compressive displacement, the foam sheet is said to have desirable haptics. That is, the foam sheet has a desired soft touch feel.

FIG. 2 is provided for the sake of illustration. In FIG. 2, the typical foams show steep upward slopes for load versus compression from zero (0) to about 0.25 mm of displacement. This indicates that when a person touches the surface of these foams with his or her finger, the foams do not readily "give way" to the touch and so the foams do not "feel" soft. It is only when more force is applied to these foams, from about 10 to about 40 N, that these typical foams more readily "give way" and compress. This is indicated in the plot of load versus compression after about 0.25 mm of displacement where the curves transition to around 45° slopes.

For comparison, the foam with a haptic factor of 2.0 does not have a steep slope from zero (0) to about 0.25 mm of displacement. More importantly, no significant transition in slope occurs after about 0.25 mm of displacement. This indicates that when a person touches the surface of this foam with his or her finger, the foam readily "gives way" to the touch, conforming to the shape of the finger and so the foam feels soft. Equally as important, the foam continues to steadily "give way" (compress) as more force is applied onto the foam, further enhancing the soft touch "haptic" feel of the foam.

It should be noted FIG. 2 shows haptic curves of various foams that are 66.7 kg/m$^3$ in section density and 2.50 mm in thickness. Varying the density or thickness of the foams will change the slopes and/or transition points of the haptics curves. However, these same foam types will still exhibit steeper initial curves followed by a transition while the haptically desirable foam will continue to exhibit a flatter curve, versus the typical foams, and continue to show no significant transition.

The "thermoforming ratio" is used to quantify moldability. The higher the thermoforming ratio value, the greater the moldability. Thermoforming ratio values are determined by heating the foam sheet in a female mold of perpendicular cylinder shape having a diameter D and a height H. The foam sheet may also be subjected to straight molding with a vacuum molding machine.

The thermoforming ratio is obtained by drawing the foam sheet into cups with increasing height (H) to diameter (D) ratio (H/D). The higher the thermoforming ratio number, the greater the moldability. The H/D limit value at which the foam sheet is capable of being stretched and elongated into a cylinder shape without tearing or breaking down is the thermoforming ratio described herein. In the examples, the diameter D used in determining the "thermoforming ratio" is 50 mm.

The thermoforming ratio is at least about 0.48 at some point in a temperature range of about 100 to about 220° C. A thermoforming ratio of at least 0.58 is preferred. In cases where the crosslinking degree is less than about 50%, a thermoforming ratio of at least about 0.68 is more preferred. In most cases, the optimal heating conditions are generally in the range of from about 20° C. below the lowest melting point of the resin blend to about 60° C. above the highest melting point of resin blend. If the thermoforming ratio is less than about 0.48, it may be difficult to mold a foam sheet into a complicated shape and such foam sheet is therefore less commercially valuable.

"Shrinkage values" provide a measure of thermal stability and is measured according to JIS K6767 by placing 150 mm×150 mm pre-cut samples into a controlled oven at 120° C. for 60 minutes or 140° C. for 10 minutes. On each sample three straight lines at 50 mm intervals are inscribed in parallel with each other in both the machine direction (MD) and transverse direction (TD). Each sample is removed from the oven after the specified time and the shrinkage in both the machine direction and the transverse direction is measured.

"Shrinkage values" are provided as percentages and are less than 5% according to the formula [(MD shrinkage+TD shrinkage)/2] when exposed to 120° C. for 1 hour and less than 10% according to this formula when exposed to 140° C. for 10 minutes.

"Crosslinking degree" is measured according to the "Toray Gel Fraction Method," where tetralin solvent is used to dissolve non-crosslinked components. In principle, non-crosslinked material is dissolved in tetralin and the crosslinking degree is expressed as the weight percentage of crosslinked material.

The apparatus used to determine the percent of polymer crosslinking includes: 100 mesh (0.0045" wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil.

Specifically, an empty wire mesh bag is weighed and the weight recorded. For each sample, about 2 grams to about 10 grams±about 5 milligrams of sample is weighed out and transferred to the wire mesh bag. The weight of the wire mesh bag and the sample, typically in the form of foam cuttings, is recorded. Each bag is attached to the corresponding number wire and clips.

When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood.

The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes.

The samples are then dried in a drying oven for about 1 hour at 120° C. The samples are cooled for a minimum of about 15 minutes. The wire mesh bag is weighed on an analytical balance and the weight is recorded.

Crosslinking degree is then calculated using the formula 100*(C−A)/(B−A), where A=empty wire mesh bag weight; B=wire bag weight+foam sample before immersion in tetralin; and C=wire bag weight+dissolved sample after immersion in tetralin.

The "melt flow index" (MFI) value for a polymer is defined and measured according to ASTM D1238 at 190° C. for polyethylenes and polyethylene based materials and at 230° C. for polypropylenes and polypropylene based materials using a 2.16 kg plunger for 10 minutes. The test time may be reduced for relatively high melt flow resins. MFI is also referred to as the "resin melt flow rate."

The "melting temperature" ($T_m$), or "melting temperatures" for a polymer or polymer foam composition comprising a polymer is measured using differential scanning calorimetry (DSC). The melting temperatures are determined by first heating a 10 to 15 mg polymer or polymer foam composition sample from room temperature to 200° C. at 10° C./min. The sample is then cooled from 200° C. to room temperature at a rate of 10° C./min, followed by a second heating from room temperature to 200° C. at 10° C./min. The melting temperatures are the peak endotherm values identified during the second heating.

The "density" of foam sheet is defined and measured using section or "overall" density, rather than a "core" density, according to JIS K6767.

The foam is a closed cell polyolefin foam sheet. Preferably, at least 90% of the cells have undamaged cell walls, more preferably at least 95%, even more preferably more than 98%. When applying the process and the source product parameters, a closed cell foam with about 98% or more undamaged cells is generally obtained.

The "shear strength" of a foam sheet is determined according to the "Toray Shear Strength Method", where a wood panel is adhered to both sides of a foam sheet. The panels are then pulled in opposite directions until the foam fails.

Specifically, the test is performed by preparing a foam sample with dimensions of at least 10 cm×10 cm and two wood panels with dimensions of 10 cm×10 cm. The wood panels are prepared by creating a 3 cm×10 cm area for adhesive on each panel by masking off the rest of the panel with tape. The adhesive is made by mixing the two component liquid adhesive kit 7132K (a two component adhesive glue system available from Bostik, Inc.) according to the manufacturer's instructions. This mixture should be used within 4 hours. The foam sample is prepared by first corona treating the surface of the foam with a laboratory or portable corona treater device. A thin line of adhesive is poured along one edge of the foam [TD (transverse direction) edge if testing MD (machine direction) shear strength and MD edge if testing TD shear strength]. The adhesive is spread with a #74 metering rod. The adhesive laydown is repeated on the 3 cm×10 cm exposed surface of one of the wood panels. Then, after 30 minutes of drying assembly of the test samples starts by placing the foam and wood panel, with tape removed, in a 140° C. oven. A clipboard may be used to hold the foam in place by clipping an edge of the foam. After 1 minute, the foam and wood panel is removed from the oven and the wood panel is placed as quickly as possible onto the foam by using a cardboard roll to evenly distribute pressure. Care must be taken to not crush the foam. Excess foam is then trimmed from the assembly. The above steps are repeated for the opposite side of the foam and the second wood panel. This includes corona treating the foam surface and waiting 30 minutes before placing in the 140° C. oven. The wood panel/foam/wood panel assembly must then be conditioned for at least 24 hours at 23±2° C. and 50±5% relative humidity. To measure shear strength, a power driven machine equipped to produce a uniform rate of grip separation of 100±10 mm/min should be used. The testing machine shall have both a suitable dynamometer and an indicating or recording system for measuring the applied force within ±2%. Other provisions for the test machine are described in ASTM D412-06, sec 6.1. To measure shear strength at elevated temperatures, a hot air circulating test chamber should be used and conform to ASTM D412-06, sec 6.2. In both cases, each wood panel should be centered into a grip in the testing machine. The assembly must be perpendicular and contact the entire length of both grip faces. As a minimum, the displacement (mm) at the maximum load (kgf) should be recorded.

The term "room temperature" as used herein means a temperature in the range of about 21° C. to about 25° C.

One aspect of the disclosure is a foam composition comprising about 15 to about 75 parts by weight of an olefin block copolymer with a controlled block sequence having a melt flow index from about 0.1 to about 15 gram per 10 minutes at 190° C. and a melting temperature of at least about 115° C.; about 25 to about 85 parts by weight of at least one polypropylene based polymer having a melt flow index from about 0.1 to about 25 gram per 10 minutes at 230° C.; crosslinks to a crosslinking degree of about 20 to about 75%; and closed cells; wherein the density of the foam composition is about 20 to about 250 kg/m$^3$.

The foam compositions may be obtained by blending a composition, comprising (i) an olefin block copolymer having a controlled block sequence distribution and (ii) a polypropylene based material, with a crosslinking monomer and chemical blowing agent.

The foam compositions may contain about 15 to about 75 parts, preferably about 20 to about 60 parts, by weight of the olefin block copolymer having a controlled block sequence distribution. If less than about 10 parts by weight of the olefin block copolymer having a controlled block sequence distribution is used, the softness and/or haptics and/or moldability of the foam may not be sufficient. If more than about 80 parts by weight are used, the thermal stability of the foam may not be sufficient.

As used herein "parts by weight" values refer to the mass of a component, (e.g., copolymer in a foam composition) present in a given composition, (e.g., a foam composition) relative to the total mass of the olefin block copolymer plus polypropylene based polymers.

The melting temperature of the olefin block copolymer having a controlled block sequence distribution is preferably at least about 115° C. and preferably more than about 118° C. If the melting temperature of the olefin block copolymer having a controlled block sequence distribution is less than 115° C., thermal stability may not be obtained.

The olefin block copolymer with controlled block sequence distribution is preferably a polydisperse multi-block copolymer comprising high or medium density crystallizable ethylene-α-olefin (hard block) with very low co-monomer (α-olefin) content and high melting temperature, alternating with low density amorphous ethylene-α-olefin (soft block) with high co-monomer content and low glass transition temperature. Examples of olefin block copolymers with controlled block sequence distributions include those commercially available under the trade name INFUSE™ OBC from the Dow Chemical Company (e.g., INFUSE™ OBC D9507.10, INFUSE™ OBC D9507.15 which is also sold as INFUSE™ OBC 9507 olefin block copolymer and also sold as INFUSE™ OBC 9507 olefin block copolymer, INFUSE™ OBC D9107.15 which is also sold as INFUSE™ OBC 9107 olefin block copolymer etc.). Such olefin block copolymers with controlled block sequence distribution are also described by published US Patent Application US2008/0269412 A1; Arriola et al., 312 *Science* 714 (2006); Gupta et al. in the article entitled "Investigation and Modification of the Melt Rehology of Olefin Block Copolymers."

The olefin block copolymer with controlled block sequence distribution may also be oil extended. Oil extension (e.g., with mineral oil, PARALUX™ process oils from Chevron Corporation, etc.) will soften the base polymer, enhance the haptic property of the polymer, and improve the processability of the polymer. This is particularly desirable in extrusion. Examples of olefin block copolymers with controlled block sequence distributions that are oil extended are those commercially available under the trade names DYNALLOY™ OBC from GLS Corporation and TELCART™ OBC from Teknor Apex Company.

The polypropylene based material (ii) used in our methods and compositions is preferably present in an amount of about 25 to about 85 parts by weight, or most preferably present in an amount of about 40 to about 80 parts by weight.

It is preferred that the olefin block copolymer having a controlled block sequence have a particular MFI of about 0.1 to about 15 g/min at 190° C. and 2.16 kg as determined by ASTM D1238. The MFI of the olefin block copolymer having a controlled block sequence is more preferably about 1 to about 5 g/10 min. The MFI of the polypropylene based material is about 0.1 to about 25 g/10 min at 230° C. and 2.16 kg as determined by ASTM D1238 and preferably about 1.5 to about 8 g/10 min. Alternatively, the MFI of the polypropylene based material is preferably about 4 to about 50 g/10 min at 230° C. and 5.0 kg as determined by ASTM D1238.

As discussed above, the MFI provides a measure of the flow characteristics of a polymer and is an indication of the molecular weight and processability of a polymer material. If the MFI values are too high, which corresponds to a low viscosity, extrusion steps according to the present disclosure can not be satisfactorily carried out. Problems associated with MFI values that are too high include low pressures during melt processing, problems with calendaring and setting the sheet thickness profile, uneven cooling profile due to low melt viscosity, poor melt strength and/or machine problems. MFI values that are too low include high pressures during melt processing, difficulties in calendaring, sheet quality and profile problems, and higher processing temperatures which cause a risk of foaming agent decomposition and activation.

The above MFI ranges are also important for the foaming steps because they reflect the viscosity of the material and the viscosity has an effect on the foaming. We believe there are several reasons why particular MFI values are far more effective for the foam compositions of the disclosure. A lower MFI material may improve some physical properties as the molecular chain length is higher creating more energy needed for chains to flow when a stress is applied. Also, the longer the molecular chain ($M_w$), the more crystal entities the chain can crystallize thus providing more strength through intermolecular ties. However, at a too low a MFI, the viscosity becomes too high. On the other hand, materials with higher MFI values have shorter chains. Therefore, in a given volume of a material with higher MFI values, there are more chain ends on a microscopic level relative to materials having a lower MFI, which can rotate and create free volume due to the space needed for such rotation (e.g., rotation occurring above the $T_g$, or glass transition temperature of the polymer). This increases the free volume and enables an easy flow under stress forces. For the purposes of the present disclosure, the MFI should be within the described ranges to provide an appropriate compromise between these properties.

During the preparation of the foam compositions, the olefin block copolymer with a controlled block sequence and polypropylene based polymer components are blended and combined with a crosslinking monomer in order to adapt, or improve, the properties of the foam compositions of the disclosure by modifying the degree of crosslinking. The crosslinking degree, or degree of crosslinking, in the present disclosure is determined according to the "Toray Gel Fraction Method" where, as described above, tetralin solvent is used to dissolve non-crosslinked components. In principle, non-crosslinked material is dissolved in tetralin and the crosslinking degree is expressed as the weight percentage of crosslinked material.

Suitable crosslinking monomers include commercially available difunctional, trifunctional, tetrafunctional, pentafunctional, and higher functionality monomers. Such crosslinking monomers are available in liquid, solid, pellet and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. In the present disclosure, about 80% pure divinylbenzene (DVB), a difunctional liquid crosslinking monomer, is used preferably in amounts from about 0.1 to about 7.5 parts per hundred units resin (PPHR) and most preferably in amounts from about 2.0 to about 4.5 PPHR. Thus, the foam compositions preferably comprise amounts of DVB from about 0.08 to about 6.0 PPHR and most preferably in amounts from about 1.6 to about 3.6 PPHR.

Additionally, such crosslinking monomers may be used alone or in any combination. Importantly, crosslinks may be generated using a variety of different techniques and can be formed both intermolecularly between different polymer molecules and intramolecularly between portions of a single polymer molecule. Such techniques include providing crosslinking monomers which are separate from a polymer chain and providing polymer chains which incorporate a crosslinking monomer containing a functional group which can form a crosslink or be activated to form a crosslink.

Typically, the composition to be blended is also combined with a thermally decomposable chemical blowing agent and/or foaming agent. Generally, there is no restriction on the type of chemical blowing agents useful in the present disclosure. Examples of chemical blowing agents include azo compounds, hydrazine compounds, carbazides, tetrazoles, nitroso compounds and carbonates. A chemical blowing agent may be employed alone or in any combination. In the present disclosure, azodicarbonamide (ADCA) is preferably used as the chemical blowing agent. Importantly, ADCA molecules are typically thermally decomposed during blowing or foaming steps. The thermal decomposition products of ADCA include nitrogen, carbon monoxide, carbon dioxide and ammonia. ADCA thermal decomposition typically occurs at temperatures between about 190 to 230° C. By controlling the amount of the chemical blowing agent the section density of the produced foam compositions can be controlled. Acceptable amounts of blowing agent for an intended foam section density can be readily determined. The chemical blowing agent is generally used in an amount of about 2.0 to about 25.0 parts by weight depending on the required density. For azodicarbonamide, about 4.0 to about 8.0 parts by weight is preferred for a 67 kg/m$^3$ foam section density.

It is preferred that the composition may be blended with the chemical blowing agent or foaming agent contains no other polymers besides the olefin block copolymer having a controlled block sequence and one polypropylene based material. It is also preferred that the composition may be blended with the chemical blowing agent, or foaming agent, contains no other polymers besides the olefin block copolymer having a controlled block sequence distribution and two polypropylene based materials.

If the difference between the decomposition temperature of the thermally decomposable blowing agent and the melting points of the resin blend is high, then a catalyst for blowing agent decomposition may be used. Exemplary catalysts include, but are not limited to, zinc oxide, magnesium oxide, calcium stearate, glycerin, and urea.

The foam compositions may also contain further additives compatible with producing the disclosed foam compositions. Common additives include, but are not limited to, organic peroxides, antioxidants, lubricants, thermal stabilizers, colorants, flame retardants, antistatic agents, nucleating agents, plasticizers, antimicrobials, antifungals, light stabilizers, UV absorbents, anti-blocking agents, fillers, deodorizers, thickeners, cell size stabilizers, metal deactivators and combinations of these.

The components of the foam compositions may be mechanically pre-mixed, if necessary, to facilitate their dispersal. If necessary, a Henshel mixer is preferably used for such pre-mixing. If the crosslinking monomer or any other additive is a liquid, the monomer and/or additives can be added through a feeding gate of an extruder or through a vent opening of an extruder equipped with a vent instead of being pre-mixed with the solid ingredients.

After blending, the mixed components of the foam compositions, including the crosslinking monomer and chemical blowing agent, are melted at a temperature range below the decomposition temperature of the thermally decomposable blowing agent and kneaded with a kneading device such as a single screw extruder, twin screw extruder, Banbury mixer, kneader mixer or mixing roll. The resulting melted preparation is then typically formed into a sheet-like material (e.g., a sheet, film, or web). Preferably, the sheet-like material is extruded with a twin-screw extruder. Another possibility for forming the sheet-like material is to use calendaring.

The melting, kneading and/or calendaring temperature is preferably at least about 10° C. below the decomposition initiation temperature of the blowing agent. If this temperature is too high, then the thermally decomposable blowing agent may decompose upon kneading, which typically results in undesirable prefoaming. The lower temperature limit for kneading and/or calendaring is the melting point of the polypropylene based material used in the composition. By kneading or calendaring the composition between these two temperature limits, a regular cell structure and a flat foam surface is obtainable once the sheet-like material is foamed.

Subsequently, the sheet-like material is subjected to irradiation with ionizing radiation at a given exposure to crosslink the composition, thereby obtaining a crosslinked sheet.

The foam compositions may contain crosslinks produced by any known method including, for example, irradiating with an ionized radiation at a given exposure or crosslinking with an organic peroxide or silane. It should be noted that irradiating with ionizing radiation produces a foam sheet comprising the disclosed compositions, which has an excellent surface appearance and uniform cells. In the past, ionizing radiation was unable to produce a sufficient degree of crosslinking when such a foam sheet was prepared with compositions comprising primarily polypropylene(s) and/or polypropylene based materials. The methods and compositions of the disclosure solve this problem. Thus, polypropylene(s) and/or polypropylene based materials can be sufficiently crosslinked with ionizing radiation by adding a crosslinking monomer in the methods and compositions of the disclosure.

Examples of ionizing radiation include, but are not limited to, alpha rays, beta rays, gamma rays, and electron beams. Among them, an electron beam having uniform energy is preferably used to prepare the foam compositions of the disclosure. Exposure time, frequency of irradiation and acceleration voltage upon irradiation with an electron beam can vary widely depending on the intended crosslinking degree and the thickness of the sheet-like material. However, it should generally be in the range of from about 10 to about 500 kGy, and preferably from about 20 to about 300 kGy, and more preferably from about 20 to about 200 kGy. If the exposure is too low, then cell stability is not maintained upon foaming. If the exposure is too high, the moldability of the resulting sheet comprising the foam compositions of the disclosure may be poor, or alternatively, the components themselves may be degraded. Also, the components present (e.g., polymers) may be softened by exothermic heat release upon exposure to electron beam radiation so that the sheet can deform when exposure is too high.

The irradiation frequency is preferably no more than four times, more preferably no more than two times, and even more preferably just one time. If the irradiation frequency is more than about 4 times, then the components themselves may suffer degradation so that upon foaming, for example, uniform cells will not be created in the resulting foam compositions.

When the thickness of the sheet-like material comprising the components of the foam compositions of the disclosure is greater than about 4 mm, irradiating each primary surface of this material with an ionized radiation is preferred to make the degree of crosslinking of the primary surface(s) and the inner layer more uniform.

Irradiation with an electron beam provides an advantage in that sheet-like materials comprising the components of the foam compositions and having various thicknesses can be effectively crosslinked by controlling the acceleration voltage of the electrons. The acceleration voltage is generally in the range of from about 200 to about 1500 kV, and preferably from about 400 to about 1200 kV, and more preferably about 600 to about 1000 kV. If the acceleration voltage is less than about 200 kV, then the radiation cannot reach the inner portion of the sheet-like material. As a result, the cells in the inner portion can be coarse and uneven on foaming. If the acceleration voltage is greater than about 150° kV, then the components themselves may degrade.

Regardless of the crosslinking technique selected, crosslinking is performed so that a crosslinking degree of about 20 to about 75%, more preferably about 30 to about 60%, as measured by the "Toray Gel Fraction Method" is obtained in the foam compositions.

Foaming is typically accomplished by heating the crosslinked sheet-like material to a temperature higher than the decomposition temperature of the thermally decomposable blowing agent. For the thermally decomposable blowing agent azodicarbonamide (ADCA), the foaming is performed at about 200 to about 260° C., preferably about 220 to about 240° C., in a continuous process. Typically, the foaming is not performed as a batch process. Instead, continuous processes are preferred for the preparation of the foam compositions of the disclosure or articles incorporating the foam compositions of the disclosure.

The foaming is typically conducted by heating the crosslinked sheet-like material with molten salt, radiant heaters, vertical hot air oven, horizontal hot air oven, microwave energy or a combination of these methods. The foaming may also be conducted in an impregnation process using, for example, nitrogen in an autoclave, followed by a free foaming via molten salt, radiant heaters, vertical hot air oven, horizontal hot air oven, microwave energy or a combination of these methods. In the present disclosure, a preferred combination of molten salt and radiant heaters is used to heat the crosslinked sheet-like material.

Optionally, before foaming, the crosslinked sheet-like material can be softened with preheating. This helps stabilize the expansion of the sheet-like material upon foaming.

The production of the crosslinked foam compositions is typically accomplished using a multi-step process comprising: 1) mixing/extrusion or mixing/kneading or mixing/calendaring a polymer matrix sheet; 2) crosslinking with a radiation source such as electron beam; and 3) a foaming process where the material is heated via a) molten salt, radiant heaters, hot air ovens, or microwave energy, or b) in an impregnation process with nitrogen in an autoclave followed by heating the material via molten salt, radiant heaters, hot air oven, or microwave energy.

A preferred process to make the foam compositions, such as a foam sheet, preferably comprises the steps of extrusion/kneading by mixing, kneading and extruding a sheet-like material; crosslinking by physical crosslinking the sheet-like material with an electron beam; foaming the sheet-like material through decomposition of an organic blowing agent added during mixing where the agent is azodicarbonamide (ADCA); and an expansion process by heating with molten salt and/or radiant heaters.

Preferably the processes for making the foam compositions are conducted such that a foam composition with a section, or "overall" density of about 20 to about 250 $kg/m^3$ or, preferably, about 30 $kg/m^3$ to about 125 $kg/m^3$, is obtained as measured by JIS K6767. The section density can be controlled by the amount of blowing agent. If the density of the foam sheet is less than about 20 $kg/m^3$, then the sheet does not foam efficiently due to a large amount of chemical blowing agent needed to attain the density. Additionally, if the density of the foam sheet is less than about 20 $kg/m^3$, then the expansion of the sheet during the foaming process becomes increasingly difficult to control. Thus, it becomes increasingly more difficult to produce a foam sheet of uniform section density and thickness. Additionally, if the density of the foam sheet is less than 20 $kg/m^3$ then the foam sheet becomes increasingly prone to cell collapse.

The foam compositions are not limited to a section density of about 250 $kg/m^3$. A foam of about 350 $kg/m^3$, about 450 $kg/m^3$, or about 550 $kg/m^3$ may also be produced. However, it is preferred that the foam compositions have a density of less than about 250 $kg/m^3$.

The average cell size is preferably from about 0.05 to about 1.0 mm and most preferably from about 0.1 to about 0.7 mm. If the average cell size is lower than about 0.05 mm, the foam compositions have reduced softness, haptics and flexibility. If the average cell size is larger than 1 mm, the foam compositions will have an uneven surface. There is also a possibility of the foam compositions being undesirably torn if the population of cells in the foam does not have the preferred average cell size where the foam composition is stretched or portions that are subjected to a secondary process. The cell size in the foam compositions of the disclosure may have a bimodal distribution representing a population of cells in the core of the foam compositions which are relatively round and a population of cells in the skin near the surfaces of the foam compositions which are relatively flat, thin and/or oblong.

The thickness of the foam compositions are from about 0.2 mm to about 50 mm, preferably from about 0.4 mm to about 40 mm, more preferably from about 0.6 mm to about 30 mm and even more preferably from about 0.8 mm to about 20 mm. If the thickness is less than about 0.2 mm, then foaming is not efficient due to significant gas loss from the primary surfaces. If the thickness is greater than about 50 mm, expansion during the foaming process becomes increasingly difficult to control. Thus, it is increasingly more difficult to produce a foam sheet comprising the foam compositions of the disclosure with uniform section density and thickness. The desired thickness can also be obtained by a secondary process such as slicing, skiving or bonding. Slicing, skiving or bonding can produce a thickness range of about 0.1 mm to about 100 mm.

The compressive strength of the foam compositions will vary according to section density, type of olefin block copolymer having a controlled block sequence, type of polypropylene based material(s), and the ratio of olefin block copolymer having a controlled block sequence to the polypropylene base material(s). The compressive strength of the foam compositions in the present disclosure (measured in units of $kg_f/cm^2$) is preferably at most 0.022 plus the section density ($kg/m^3$) multiplied by 0.0089. The compressive strength is measured, as described above, according to JIS K6767, where 50×50 mm pre-cut foam is stacked to about 25 mm and compressed at a rate of 10 mm/min to 75% of the original stacked height. The compression is then maintained for 20 seconds, after which the compressive strength is recorded.

The foam compositions have an advantageous combination of softness, haptics, moldability and thermal stability.

The foam composition may have a compressive strength and density selected from the group consisting of a) a compressive strength of less than about 0.35 $kg_f/cm^2$ and a density of less than about 40 $kg/m^3$; b) a compressive strength of less than about 0.51 $kg_f/cm^2$ and a density of about 40 to about 59 $kg/m^3$; c) a compressive strength of less than about 0.66 $kg_f/cm^2$ and a density of about 60 to about 79 $kg/m^3$; d) a compressive strength of less than about 0.82 $kg_f/cm^2$ and a density of about 80 to about 99 $kg/m^3$; and e) a compressive strength of less than about 0.98 $kg_f/cm^2$ and a density of about 100 to about 119 $kg/m^3$.

The haptic value of the foam composition may be about 3.2 or less, preferably 2.2 or less.

The thermoforming ratio of the foam composition may be at least about 0.48 at a temperature in the range of about 100 to about 220° C.

The shrinkage value of the foam composition after 1 hour at 120° C. may be less than about 5% and the shrinkage value of the foam composition after 10 minutes at 140° C. may be less than about 10%.

The polypropylene based polymer may be selected from the group consisting of a polypropylene, impact modified polypropylene, polypropylene-ethylene copolymer, metallocene polypropylene, metallocene polypropylene-ethylene copolymer, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

The melting temperature of the polypropylene based material in the methods and compositions of the disclosure is preferably at least about 135° C. and most preferably more than about 140° C. If the polypropylene based material has a melting temperature below about 130° C., good thermal stability may not be obtained in a foam composition.

An example of an appropriate polypropylene is an isotactic homopolypropylene.

An example of an appropriate impact modified polypropylene is a homopolypropylene with ethylene-propylene copolymer rubber or ethylene-propylene-(nonconjugated diene) copolymer rubber. Two specific examples are the TI4015F and TI4015F2 resins commercially available from Sunoco Chemicals.

Appropriate metallocene polypropylenes include metallocene syndiotactic homopolypropylene, metallocene atactic homopolypropylene, or metallocene isotactic homopolypropylene. Examples of metallocene polypropylenes are those commercially available under the trade names METOCENE™ from LyondellBasell and ACHIEVE™ from ExxonMobil. Metallocene polypropylenes are also commercially available from Total Petrochemicals USA and include grades M3551, M3282MZ, M7672, 1251, 1471, 1571, and 1751.

Polypropylene based polyolefin plastomer (POP) and/or polypropylene based polyolefin elastoplastomer is a propylene based copolymer. Examples of polypropylene based polyolefin plastomer polymers are those commercially available under the trade name VERSIFY™ from the Dow Chemical Company and VISTAMAXX™ from ExxonMobil.

Polypropylene based polyolefin elastomer (POE) is a propylene based copolymer. Examples of propylene based polyolefin elastomers are those polymers commercially available under the trade names THERMORUN™ and ZELAS™ from Mitsubishi Chemical Corporation, ADFLEX™ and SOFTELL™ from LyondellBasell, VERSIFY™ from the Dow Chemical Company and VISTAMAXX™ from ExxonMobil.

Polypropylene based thermoplastic polyolefin blend (TPO) is homopolypropylene and/or polypropylene-ethylene copolymer and/or metallocene homopolypropylene, any of which may have ethylene-propylene (EP) copolymer rubber or ethylene-propylene (nonconjugated diene) (EPDM) copolymer rubber in amounts great enough to give the thermoplastic polyolefin blend (TPO) plastomeric, elastoplastomeric or elastomeric properties. Examples of polypropylene based polyolefin blend polymers are those polymer blends commercially available under the trade names EXCELINK™ from JSR Corporation, THERMORUN™ and ZELAS™ from Mitsubishi Chemical Corporation, FERROFLEX™ and RxLOY™ from Ferro Corporation and TELCAR™ from Teknor Apex Company. These polymer blends may optionally be oil extended with, for example, mineral oil, PARALUX™ process oils from Chevron Corporation, etc. to further soften the blend, enhance the haptic property of the blend and improve the processability of the blend. Oil extension of these polymer blends is preferred especially in extrusion.

Polypropylene based thermoplastic elastomer blend (TPE) is homopolypropylene and/or polypropylene-ethylene copolymer and/or metallocene homopolypropylene, any of which may have diblock or multiblock thermoplastic rubber modifiers (SEBS, SEPS, SEEPS, SEP, SEBC, CEBC, HSB, etc.) in amounts great enough to give the thermoplastic elastomer blend (TPE) plastomeric, elastoplastomeric or elastomeric properties. Examples of polypropylene based thermoplastic elastomer blend polymers are those polymer blends commercially available under the trade name DYNAFLEX® and VERSAFLEX® from GLS Corporation, MONPRENE® and TEKRON® from Teknor Apex Company and DURAGRIP® from Advanced Polymer Alloys. These polymer blends may optionally be oil extended with, for example, mineral oil, PARALUX™ process oils from Chevron Corporation, etc. to further soften the blend, enhance the haptic property of the blend and improve the processability of the blend. Oil extension of these polymer blends is preferred especially in extrusion.

We also provide a laminate composition comprising a first layer of a foam composition and a second layer selected from the group consisting of a film, a fabric, a fiber layer and a leather.

In the laminates, the foam compositions can, for example, be combined with a film and/or foil. Examples of suitable materials for such layers include polyvinyl chloride (PVC); thermoplastic polyolefin (TPO); thermoplastic urethane (TPU); fabrics such as polyester, polypropylene, cloth and other fabrics; leather and/or fiber layers such as non-wovens. Such layers may be manufactured using standard techniques that are well known to those of ordinary skill in the art. Importantly, the foams of the disclosure may be laminated on one or both sides with these materials and may comprise multiple layers.

In the laminates, a layer may be joined to an adjacent layer by means of chemical bonds, mechanical means and/or combinations of these. Adjacent laminate layers may also be affixed to each other by any other means including the use of attractive forces between materials having opposite electromagnetic charges or attractive forces present between materials which both have either a predominantly hydrophobic character or a predominantly hydrophilic character.

The foam compositions or laminate compositions can preferably be used in automobile interior parts such as door panels, door rolls, door inserts, door stuffers, trunk stuffers, armrests, center consoles, seat cushions, seat backs, headrests, seat back panels, instrument panels, knee bolsters or a headliner. These compositions can also be used in furniture (e.g., commercial, office and residential furniture) such as chair cushions, chair backs, sofa cushions, sofa trims, recliner cushions, recliner trims, couch cushions, couch trim, sleeper cushions, or sleeper trims. These compositions can also be used in walls such as modular walls, moveable walls, wall panels, modular panels, office system panels, room dividers or portable partitions. The compositions can also be used in storage casing (e.g., commercial, office and residential) which is either mobile or stationary. The compositions can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings or architectural coverings. Additionally, these compositions can be used in tapes or gaskets. Those of ordinary skill in the art will also recognize a variety of different components and related applications for the foam compositions of the disclosure.

For applications where the foam compositions or laminates are to be used as a tape or gasket, a pressure sensitive adhesive layer may be disposed on at least a portion of one or both major surfaces. Any pressure sensitive adhesive known in the art may be used. Examples of such pressure sensitive adhesives are acrylic polymers, polyurethanes, thermoplastic elastomers, block copolymers, polyolefins, silicones, rubber based adhesives, copolymers of ethylhexyl acrylate and acrylic acid, copolymers of isooctyl acrylate and acrylic acid, blends of acrylic adhesives and rubber based adhesives as well as combinations of the foregoing.

To satisfy the requirements of automotive interior trim, furniture, walls, storage casing, coverings, tape and gasket applications, the foam sheet compositions of the present disclosure may be subjected to various secondary processes, including and not limited to, embossing, corona or plasma or flame treatment, surface roughening, surface smoothing, perforation or microperforation, splicing, slicing, skiving, layering, bonding and hole punching.

We further provide foam compositions comprising an olefin block copolymer with a controlled block sequence having a melt flow index of about 0.75 to about 6.0 gram per 10 minutes at 190° C. and a melting temperature of about 120 to about 124° C.; at least one polypropylene based polymer having a melt flow index of about 1.3 to about 2.5 gram per 10 minutes at 230° C. and a melting temperature of about 137 to about 168° C.; crosslinks formed from about 2.95 to about 3.63 parts per hundred units resin of divinylbenzene crosslinker to a crosslinking degree of about 29 to about 47%; and closed cells; wherein the foam composition has a density of about 32 to about 83 kg/m$^3$, a compressive strength of about 0.27 to about 0.57 kg/cm$^2$, a durometer hardness of about 47 to about 64 Shore OO, a haptic factor of about 1.0 to about 2.8; a shrinkage value of about 1.7 to about 3.3% after 1 hour at 120° C., and a shrinkage value of about 3.4 to about 9.9% after 10 minutes at 140° C.

The melting temperatures of the foam composition may be about 121° C. to about 123° C. and about 139° C. to about 165° C.

The thermoforming ratio may be greater than about 0.90 at a temperature of 160° C. or a temperature of 170° C.

The thermoforming ratio may be about 0.78 to about 0.82 at a temperature of 170° C.

The thermoforming ratio may be about 0.68 to about 0.70 at a temperature of 160° C. or a temperature of 170° C.

The thermoforming ratio may be about 0.60 to about 0.62 at a temperature of 170° C. and about 0.56 to about 0.58 at a temperature of 180° C.

The thermoforming ratio may be about 0.82 at a temperature of 150° C. and about 0.70 at a temperature of 170° C.

The thermoforming ratio may be about 0.62 at a temperature of 175° C.

The foam composition may further comprise azodicarbonamide or thermal decomposition products of azodicarbonamide.

We still further provide foam compositions made by a process comprising the steps of a) blending a composition comprising (i) about 15 to about 75 parts by weight of an olefin block copolymer with a controlled block sequence having a melt flow index of about 0.1 to about 15 grams per 10 minutes at 190° C. and a melting temperature of at least about 115° C., (ii) about 25 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 20 to about 75%; and c) foaming the crosslinked composition at an elevated temperature to obtain a foam composition having a density of about 20 to about 250 kg/m$^3$.

The process may further comprise the step of extruding the blended composition.

The chemical blowing agent may be azodicarbonamide.

The crosslinking monomer may be divinylbenzene.

We also provide methods for making a foam composition comprising the steps of a) blending a composition comprising (i) about 15 to about 75 parts by weight of an olefin block copolymer with a controlled block sequence having a melt flow index of about 0.1 to about 15 grams per 10 minutes at 190° C. and a melting temperature of at least about 115° C., (ii) about 25 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 20 to about 75%; and c) foaming the crosslinked composition at an elevated temperature to obtain a foam composition having a density of about 20 to about 250 kg/m3. The methods may also comprise one or more specific features of the individual methods, such as those described in the Examples, used to make particular foam compositions.

We also provide a foam composition comprising about 15 to about 50 parts by weight of an olefin block copolymer with a controlled block sequence having a melt flow index from about 0.1 to about 15 gram per 10 minutes at 190° C. and a melting temperature of at least about 115° C.; about 50 to about 85 parts by weight of at least one polypropylene based polymer having a melt flow index from about 0.1 to about 25 gram per 10 minutes at 230° C.; crosslinks to a crosslinking degree of about 45 to about 75%; and closed cells; wherein the density of the foam composition be about 20 to about 250 kg/m³.

It is preferred that the foam composition have a compressive strength and density selected from the group consisting of: a) a compressive strength of less than about 0.46 kg$_f$/cm² and a density of less than about 40 kg/m³; b) a compressive strength of less than about 0.76 kg$_f$/cm² and a density of about 40 to about 59 kg/m³; c) a compressive strength of less than about 1.07 kg$_f$/cm² and a density of about 60 to about 79 kg/m³; d) a compressive strength of less than about 1.38 kg$_f$/cm² and a density of about 80 to about 99 kg/m³; and e) a compressive strength of less than about 1.68 kg$_f$/cm² and a density of about 100 to about 119 kg/m³.

It is preferred that the foam composition have a haptic value of 3.2 or less.

It is preferred that the shear strength of the foam composition be at least one selected from the group consisting of: a) greater than about 50 kg$_f$ at a temperature in the range of about 60 to about 80° C.; b) greater than about 11 kg; when measured at 140° C.; c) greater than about 9 kg; when measured at 150° C.; d) greater than about 6 kg; when measured at 160° C.; e) greater than about 4 kg; when measured at 170° C.; 0 greater than about 2 kg$_f$ when measured at 180° C.; and g) about 2 kg; to about 50 kg$_f$ at a temperature in the range of about 60 to about 180° C.

We further provide foam composition comprising an olefin block copolymer with a controlled block sequence having a melt flow index of about 0.75 to about 1.25 gram per 10 minutes at 190° C. and a melting temperature of about 120 to about 122° C.; at least one polypropylene based polymer having a melt flow index of about 1.7 to about 2.5 gram per 10 minutes at 230° C. and a melting temperature of about 146 to about 148° C.; crosslinks formed from about 3.95 to about 4.05 parts per hundred units resin of divinylbenzene crosslinker to a crosslinking degree of about 55 to about 60%; and closed cells; wherein the foam composition has a density of about 66 to about 72 kg/m³, a compressive strength of about 0.77 to about 0.83 kg$_f$/cm², a durometer hardness of about 70 to about 73 Shore OO, a haptic factor of about 2.3 to about 2.5; a shrinkage value of about 1.6 to about 1.9% after 1 hour at 120° C., a shrinkage value of about 6.9 to about 8.3% after 10 minutes at 140° C., a shrinkage value of about 28.1 to about 28.6% after 10 minutes at 160° C., a shear strength of about 63.8 to about 73.5 kg$_f$ at about 60 to about 80° C., a shear strength of about 14.4 to about 16.4 kg$_f$ at 140° C., a shear strength of about 12.0 to about 12.5 kg$_f$ at 150° C., a shear strength of about 8.8 to about 10.9 kg$_f$ at 160° C., a shear strength of about 6.8 to about 7.6 kg$_f$ at 170° C. and a shear strength of about 3.6 to about 3.9 kg$_f$ at 180° C.

It is preferred that the melting temperatures of the foam composition be about 118° C. to about 121° C. and about 144° C. to about 147° C.

It is preferred that the thermoforming ratio be about 0.58 at a temperature of 155° C. or a temperature of 170° C.

We also provide a foam composition made by a process comprising the steps of: a) blending a composition comprising (i) about 15 to about 50 parts by weight of an olefin block copolymer with a controlled block sequence having a melt flow index of about 0.1 to about 15 grams per 10 minutes at 190° C. and a melting temperature of at least about 115° C., (ii) about 50 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 45 to about 75%; and c) foaming the crosslinked composition at an elevated temperature to obtain a foam composition having a density of about 20 to about 250 kg/m³.

We further provide a method for making a foam composition comprising the steps of: a) blending a composition comprising (i) about 15 to about 50 parts by weight of an olefin block copolymer with a controlled block sequence having a melt flow index of about 0.1 to about 15 grams per 10 minutes at 190° C. and a melting temperature of at least about 115° C., (ii) about 50 to about 85 parts by weight of at least one polypropylene based polymer having a melt flow index from about 0.1 to about 25 grams per 10 minutes at 230° C., (iii) a crosslinking monomer and (iv) a chemical blowing agent to produce a blended composition; b) crosslinking the blended composition to obtain a crosslinked composition having a crosslinking degree of about 45 to about 75%; and c) foaming the crosslinked composition at an elevated temperature to obtain a foam composition having a density of about 20 to about 250 kg/m³.

EXAMPLES

Foam compositions were made using the components indicated in Tables 1-5 below. Foam compositions were made by mixing the components (e.g., polymer resins and additives), blending, extrusion, irradiation and foaming as indicated in the Tables.

For example, as seen in Table 1, the components used to make the claimed foam compositions were the olefin block copolymer INFUSE™ OBC 9507 made by Dow Chemical Company having a MFI of 5.0 at 190° C. and 2.16 kg, a DSC melting temperature of 123° C.; olefin block copolymer INFUSE™ OBC 9107 made by Dow Chemical Company having a MFI of 0.1 at 190° C. and 2.16 kg, a DSC melting temperature of 121° C.; polypropylene random copolymer (PP RCP) 7250FL made by Total Petrochemicals, USA having a MFI of 1.5 at 230° C. and 2.16 kg, a DSC melting temperature of 138° C. and ethylene content of 2.5 to 2.9%; polypropylene random copolymer (PP RCP) TR3020F made by Sunoco Chemicals having a MFI of 2.1 at 230° C. and 2.16 kg, a DSC melting temperature of 147° C. and ethylene content of 2.7 to 3.7%; ethylene-propylene rubber modified polypropylene homopolymer (impact hPP) TI4015F and/or TI4015F2 made by Sunoco Chemicals having a MFI of 1.7 at 230° C. and 2.16 kg and a DSC melting temperature of 167° C.; azodicarbonamide (ADCA") Azofoam™ TC-181 made by PT Lautan Otsuka Chemical, Indonesia; divinylbenzene (DVB) as "Divinylbenzene HP" made by Dow Chemical Company which is provided as 80% pure divinylbenzene and the Toray antioxidant package PR023 comprising 85.65% low density polyethylene, 14% antioxidants and 0.35% calcium stearate which is compounded by Techmer PM and/or Adell Plastics, Inc.

Table 1 shows the components, manufacturing parameters and properties for sheets comprising foam compositions made using olefin block copolymers having a controlled block sequence distribution (OBC) as a softening ingredient. The foam compositions of Table 1 represent working examples of foam compositions in which all four desired physical properties (softness, haptics, moldability and thermal stability) are present.

TABLE 1

Resins

| example | resin type | form | manufacturer | commercial name | amt | MFI (2.16 kg) | durometer hardness | DSC melting temperature (° C.) |
|---|---|---|---|---|---|---|---|---|
| example 1 | OBC | pulverized pellet | Dow Chemical Company | Infuse™ OBC D9507 | 60 | 4.0-6.0 (190° C.) | 58-60 shore A | 122-124 |
|  | PP RCP | flake | Total Petrochemicals, USA | 7250FL | 40 | 1.3-1.6 (230° C.) | n/a | 137-139 |
| example 2 | OBC | pulverized pellet | Dow Chemical Company | Infuse™ OBC D9507 | 60 | 4.0-6.0 (190° C.) | 58-60 shore A | 122-124 |
|  | PP RCP | flake | Total Petrochemicals, USA | 7250FL | 20 | 1.3-1.6 (230° C.) | n/a | 137-139 |
|  | PP RCP | pulverized pellet | Sunoco Chemicals | TR3020F | 20 | 1.7-2.5 (230° C.) | n/a | 146-148 |
| example 3 | OBC | ⅔ pellet, ⅓ pulverized pellet | Dow Chemical Company | Infuse™ OBC D9507 | 60 | 4.0-6.0 (190° C.) | 58-60 shore A | 122-124 |
|  | PP RCP | pulverized pellet | Sunoco Chemicals | TR3020F | 40 | 1.7-2.5 (230° C.) | n/a | 146-148 |
| example 4 | OBC | ⅔ pellet, ⅓ pulverized pellet | Dow Chemical Company | Infuse™ OBC D9507 | 60 | 4.0-6.0 (190° C.) | 58-60 shore A | 122-124 |
|  | impact hPP | pulverized pellet | Sunoco Chemicals | TI4015F/TI4015F2 | 40 | 1.4-2.0 (230° C.) | n/a | 166-168 |
| example 5 | OBC | pulverized pellet | Dow Chemical Company | Infuse™ OBC 9107 | 60 | 0.75-1.25 (190° C.) | 59-61 shore A | 120-122 |
|  | PP RCP | pulverized pellet | Sunoco Chemicals | TR3020F | 40 | 1.7-2.5 (230° C.) | n/a | 146-148 |

Blending Parameters / Extrusion Parameters

| example | 80% Pure DVB crosslinker (PPHR) | ADCA blowing agent (PPHR) | antioxidant package (PPHR) | low speed blending (sec) | high speed blending (sec) | maximum blending temperature (° C.) | extrusion temperature (° C.) | extrusion rate (kg/hr) | die/resin pressure (psi) | extrusion thrust load (ton) | extrusion sheet thickness (mm) |
|---|---|---|---|---|---|---|---|---|---|---|---|
| example 1 | 3.20-3.30 | 6.64-6.74 | 4.95-5.05 ("PR023") | 30 | 530 | 63 | 147 | 150 | 1240 | 17.9 | 1.255 |
| example 2 | 3.20-3.30 | 6.64-6.74 | 4.95-5.05 ("PR023") | 30 | 530 | 64 | 147 | 150 | 1220 | 17.4 | 1.255 |
| example 3 | 3.53-3.63 | 13.75-13.85 | 4.95-5.05 ("PR023") | 30 | 530 | 69 | 158 | 180 | 1380 | 21.4 | 1.425 |
| example 4 | 3.53-3.63 | 13.75-13.85 | 4.95-5.05 ("PR023") | 30 | 530 | 69 | 168 | 210 | 1430 | 21.9 | 1.425 |
| example 5 | 2.95-3.05 | 6.95-7.05 | 5.45-5.55 ("PR023") | 30 | 530 | 78 | 150 | 190 | 2050 | 27.1 | 1.400 |
|  |  |  |  | 30 | 530 | 78 | 150 | 190 | 2040 | 27.7 | 1.400 |

Foaming Parameters

| example | irradiation voltage (kV) | irradiation beam current (mA) | irradiation line speed (m/min) | irradiation scan width (mm) | sheet supply speed (m/min) | preheated? | foaming temperature (° C.) | foamed sheet exit speed (m/min) | thickness (mm) | density (kg/m3) | crosslinking degree (%) | DSC melting temperature (° C.) |
|---|---|---|---|---|---|---|---|---|---|---|---|---|
| example 1 | 700 | 65 | 21.9 | 1200 | 6.5 | no | 233 | 17.3-17.9 | 2.1 | 79-83 | 29-33 | 121-123, 139-141 |
| example 2 | 700 | 65 | 21.9 | 1200 | 6.5 | no | 233 | 17.3-17.9 | 2.4 | 65-69 | 30-34 | 121-123, 141-143 |
| example 3 | 800 | 65 | 22.2 | 1200 | 5.6 | no | 226-233 | 21.6 | 3.2 | 32-36 | 29-33 | 121-123, 145-147 |
| example 4 | 800 | 65 | 22.2 | 1200 | 5.6 | no | 227-232 | 21.7 | 2.9 | 35-39 | 29-33 | 121-123, 163-165 |
| example 5 | 700 | 65 | 24.0 | 1200 | 6.8 | no | 230-233 | 17.9 | 2.6 | 65-69 | 34-36 | n/a |
|  | 700 | 65 | 20.1 | 1200 | 6.8 | no | 228-233 | 18.4 | 2.6 | 64-68 | 45-47 |  |

Foamed Sheet Parameters

| example | compressive strength (kgf/cm2) | acceptable softness? | durometer (shore OO @ 15 sec) | haptic factor | acceptable haptic? | thermoforming ratios | acceptable moldability? | shrinkage @ 120° C. (%) | shrinkage @ 140° C. (%) | thermally stable? |
|---|---|---|---|---|---|---|---|---|---|---|
| example 1 | 0.45 ± 10% | yes | 59-61 | 1.5 ± 5% | yes | 160° C. & 170° C.: >0.90 | yes | 3.0 ± 10% | 9.0 ± 10% | yes |
| example 2 | 0.39 ± 10% | yes | 58-60 | 1.5 ± 5% | yes | 170° C.: 0.78-0.82 | yes | 2.4 ± 10% | 7.6 ± 10% | yes |
| example 3 | 0.30 ± 10% | yes | 47-49 | 1.3 ± 5% | yes | 160° C. & 170° C.: 0.68-0.70 | yes |  |  |  |
| example 4 | 0.33 ± 10% | yes | 49-51 | 1.1 ± 5% | yes | 170° C.: 0.60-0.62, 180° C.: 0.56-0.58 | yes | 2.3 ± 10% | 3.8 ± 10% | yes |

TABLE 1-continued

| example 5 | 0.49 ± 10% | yes | 61-63 | 2.7 ± 5% | yes | 150° C.: 0.82, 170° C.: 0.70 | yes | 1.9 ± 10% | 5.7 ± 10% | yes |
| | 0.52 ± 10% | yes | 62-64 | 2.6 ± 5% | yes | 175° C.: 0.62 | yes | 2.8 ± 10% | 8.2 ± 10% | yes |

Table 2 shows the components, manufacturing parameters and properties for sheets comprising foam compositions made using olefin block copolymers having a controlled block sequence distribution (OBC) as a softening ingredient. The foam compositions of Table 2 represent comparative examples of foam compositions in which all four desired physical properties (softness, haptics, moldability, and thermal stability) are not present.

Table 3 shows the components, manufacturing parameters and properties for sheets comprising foam compositions made using copolymers, which are not olefin block polymers having a controlled block sequence distribution (OBC) as a softening ingredient. The foam compositions of Table 3 represent comparative examples of foam compositions in which all four desired physical properties (softness, haptics, moldability and thermal stability) are not present.

TABLE 2

| | | | | Resins | | | | |
|---|---|---|---|---|---|---|---|---|
| example | resin type | form | manufacturer | commercial name | amt (%) | MFI (2.16 kg) | durometer hardness | DSC melting temperature (° C.) |
| comparative example 1 | OBC | pellet | Dow Chemical Company | Infuse ™ OBC D9507 | 40 | 4.0-6.0 (190° C.) | 58-60 shore A | 122-124 |
| | PP RCP | flake | Total Petrochemicals, USA | 7250FL | 30 | 1.3-1.6 (230° C.) | n/a | 137-139 |
| | PP RCP | pulverized pellet | Sunoco Chemicals | TR3020F | 30 | 1.7-2.5 (230° C.) | n/a | 146-148 |
| comparative example 2 | OBC | pellet | GLS Corporation | Dynalloy ® OBC8000-T05 | 20 | 20-40 (190° C.) | 58-60 shore OO (10 sec) | 109-111 |
| | VLDPE | pulverized pellet | Dow Chemical Company | Flexomer ™ DFDA-1095 | 50 | 0.8-2.0 (190° C.) | 77-79 shore A (5 sec) | 113-115 |
| | PP RCP | flake | Total Petrochemicals, USA | TR3020F | 30 | 1.7-2.5 (230° C.) | n/a | 137-139 |

| | Additives | | | Blending Parameters | | | Extrusion Parameters | | | | |
|---|---|---|---|---|---|---|---|---|---|---|---|
| | | | | | | | | extrusion | | | |
| example | 80% Pure DVB crosslinker (PPHR) | ADCA blowing agent (PPHR) | antioxidant package (PPHR) | low speed blending (sec) | high speed blending (sec) | maximum blending temperature (° C.) | extrusion temperature (° C.) | extrusion rate (kg/hr) | die/resin pressure (psi) | extrusion thrust load (ton) | extrusion sheet thickness (mm) |
| comparative example 1 | 2.70-2.80 | 5.78-5.88 | 4.95-5.05 ("PR023") | 30 | 530 | 58 | 160 | 240 | 1410 | 20.8 | 1.400 |
| comparative example 2 | 3.53-3.63 | 9.14-9.24 | 4.95-5.05 ("PR022") | 30 | 530 | 81 | 149 | 200 | n/a | 18.8 | 1.550 |

| | | | | | Foaming Parameters | | | | | | |
|---|---|---|---|---|---|---|---|---|---|---|---|
| | Irradiation Parameters | | | | foaming | | foamed | | Foamed Sheet Parameters | | |
| example | irradiation voltage (kV) | irradiation beam current (mA) | irradiation line speed (m/min) | irradiation scan width (mm) | sheet supply speed (m/min) | preheated? | foaming temperature (° C.) | sheet exit speed (m/min) | thickness (mm) | density (kg/m3) | crosslinking degree (%) | DSC melting temperature (° C.) |
| comparative example 1 | 800 | 65 | 19.2 | 1200 | 6.5 | no | 229-232 | 16.9 | 2.6 | 62-66 | 39-43 | n/a |
| comparative example 2 | 800 | 65 | 20.1 | 1200 | 5.6 | yes | 229-232 | 163 | 3.3 | 45-49 | 31-35 | n/a |

| | Foamed Sheet Parameters | | | | | | | | | |
|---|---|---|---|---|---|---|---|---|---|---|
| example | compressive strength (kgt/cm2) | acceptable softness? | durometer (shore OO @ 15 sec) | haptic factor | acceptable haptic? | thermoforming ratios | acceptable moldability? | shrinkage @ 120° C. (%) | shrinkage @ 140° C. (%) | thermally stable? |
| comparative example 1 | 0.68 ± 10% | no | 70-72 | 2.4 ± 5% | yes | 170° C.: 0.78-0.82 | yes | 1.0 ± 10% | 4.5 ± 10% | yes |
| comparative example 2 | 0.38 ± 10% | yes | n/a | n/a | n/a | 130° C.: 0.60-0.62 | yes | 3.2 ± 10% | n/a | n/a |

TABLE 3

| example | resin type | form | manufacturer | commercial name | amt (%) | MFI (2.16 kg) | durometer hardness | DSC melting temperature (°C.) |
|---|---|---|---|---|---|---|---|---|
| comparative example 3 | VLDPE | pulverized pellet | Dow Chemical Company | Flexomer ™ DFDA-1095 | 70 | 0.8-2.0 (190° C.) | 77-79 shore A (5 sec) | 113-115 |
|  | PP RCP | flake | Total Petrochemicals, USA | 7250FL | 30 | 1.3-1.6 (230° C.) | n/a | 137-139 |
| comparative example 4 | VLDPE | pulverized pellet | Dow Chemical Company | Flexomer ™ ETS-9078 | 70 | 2.2-2.8 (190° C.) | n/a | 119-121 |
|  | PP RCP | flake | Total Petrochemicals, USA | 7250FL | 30 | 1.3-1.6 (230° C.) | n/a | 137-139 |
| comparative example 5 | VLDPE | pulverized pellet | Dow Chemical Company | Flexomer ™ DFDB-1085 | 70 | 0.6-0.9 (190° C.) | 78-80 shore A (5 sec) | 113-115 |
|  | PP RCP | flake | Total Petrochemicals, USA | 7250FL | 30 | 1.3-1.6 (230° C.) | n/a | 137-139 |
| comparative example 6 | VLDPE | pulverized pellet | Dow Chemical Company | Flexomer ™ DFDB-1085 | 60 | 0.6-0.9 (190° C.) | 78-80 shore A (5 sec) | 113-115 |
|  | PP RCP | flake | Total Petrochemicals, USA | 7250FL | 40 | 1.3-1.6 (230° C.) | n/a | 137-139 |
| comparative example 7 | EMA | pulverized pellet | E. I. du Pont de Nemours | Elvaloy ® 1224 AC | 70 | 1.6-2.4 (190° C.) | 77-79 shore A (instant) | 90-92 |
|  | PP RCP | flake | Total Petrochemicals, USA | 7250FL | 30 | 1.3-1.6 (230° C.) | n/a | 137-139 |
| comparative example 8 | EBA | pulverized pellet | Arkema Inc. | Lotryl ® 30 BA 02 | 70 | 1.5-2.5 (190° C.) | 74-76 shore A (instant) | 77-79 |
|  | PP RCP | flake | Total Petrochemicals, USA | 7250FL | 30 | 1.3-1.6 (230° C.) | n/a | 137-139 |
| comparative example 9 | POE | pulverized pellet | HiTech Polymers, Inc. | HiLast HTP TPE 1045 | 70 | 1.2-1.8 (190° C.) | 41-43 shore A (instant) | 51-53 |
|  | PP RCP | flake | Total Petrochemicals, USA | 7250FL | 30 | 1.3-1.6 (230° C.) | n/a | 137-139 |
| comparative example 10 | VLDPE | pulverized pellet | Dow Chemical Company | Flexomer ™ DFDA-1095 | 50 | 0.8-2.0 (190° C.) | 77-79 shore A (5 sec) | 113-115 |
|  | PP RCP | flake | Total Petrochemicals, USA | 7250FL | 30 | 1.3-1.6 (230° C.) | n/a | 137-139 |
|  | POE | pellet | ExxonMobil Chemical Co. | Vistamaxx ™ 6102 | 20 | 1.5-4.5 (230° C.) | 66-68 shore A (15 sec) | amorphous |
| comparative example 11 | PP RCP | flake | Total Petrochemicals, USA | 7250FL | 35 | 1.3-1.6 (230° C.) | n/a | 137-139 |
|  | PP RCP | pulverized pellet | Sunoco Chemicals | TR3020F | 35 | 1.7-2.5 (230° C.) | n/a | 146-148 |
|  | POE | pellet | ExxonMobil Chemical Co. | Vistamaxx ™ 6102 | 30 | 1.5-4.5 (230° C.) | 66-68 shore A (15 sec) | amorphous |

| example | Additives 80% Pure DVB crosslinker (PPHR) | ADCA blowing agent (PPHR) | antioxidant package (PPHR) | Blending Parameters low speed blending (sec) | high speed blending (sec) | maximum blending temperature (°C.) | Extrusion Parameters extrusion temperature (°C.) | extrusion rate (kg/hr) | die/ resin pressure (psi) | extrusion thrust load (ton) | extrusion sheet thickness (mm) |
|---|---|---|---|---|---|---|---|---|---|---|---|
| comparative example 3 | 3.53-3.63 | 9.14-9.24 | 4.95-5.05 ("PR022") | 30 | 530 | 67 | 149 | 200 | n/a | n/a | 1.550 |
| comparative example 4 | 3.53-3.63 | 9.14-9.24 | 4.95-5.05 ("PR023") | 30 | 530 | 68 | 153 | 200 | 1600 | 23.6 | 1.625 |
|  | 3.53-3.63 | 6.58-6.68 | 4.95-5.05 ("PR023") | 30 | 530 | 69 | 153 | 200 | 1990 | 24.6 | 1.375 |
| comparative example 5 | 3.20-3.30 | 8.95-9.05 | 4.95-5.05 ("PR023") | 30 | 530 | 66 | 153 | 155 | 1900 | 27.4 | 1.675 |
|  | 3.20-3.30 | 6.64-6.74 | 4.95-5.05 ("PR023") | 30 | 530 | 66 | 155 | 150 | 1830 | 26.9 | 1.275 |
|  | 3.53-3.63 | 6.08-6.18 | 4.95-5.05 ("PR022") | 30 | 530 | 66 | 151 | 155 | 1920 | 24.5 | 1.675 |
| comparative example 6 | 3.20-3.30 | 13.75-13.85 | 4.95-5.05 ("PR023") | 30 | 530 | 60 | 153 | 150 | 1830 | 27.4 | 1.425 |
| comparative example 7 | 3.51-3.61 | 7.64-7.74 | 4.95-5.05 ("PR022") | 30 | 530 | 63 | 144 | 200 | 1540 | 23.2 | 1.125 |
| comparative example 8 | 3.51-3.61 | 7.64-7.74 | 4.95-5.05 ("PR022") | 30 | 530 | 60 | 146 | 190 | 2030 | 26.3 | 1.125 |
| comparative example 9 | 3.51-3.61 | 7.64-7.74 | 4.95-5.05 ("PR022") | 380 | 60 | 47 | n/a | n/a | n/a | n/a | 1.125 |
| comparative example 10 | 3.53-3.63 | 9.14-9.24 | 4.95-5.05 ("PR022") | 60 | 470 | 64 | 149 | 200 | 1660 | 22.3 | 1.550 |

TABLE 3-continued

| example | irradiation voltage (kV) | irradiation beam current (mA) | irradiation line speed (m/min) | irradiation scan width (mm) | | | | | | | | |
|---|---|---|---|---|---|---|---|---|---|---|---|---|
| comparative example 11 | 3.20-3.30 | 6.64-6.74 | 4.95-5.05 ("PR023") | 60 | 470 | 59 | 160 | 200 | n/a | | 25.4 | 1.255 |

| | Irradiation Parameters | | | | Foaming Parameters | | | Foamed Sheet Parameters | | | |
|---|---|---|---|---|---|---|---|---|---|---|---|
| example | irradiation voltage (kV) | irradiation beam current (mA) | irradiation line speed (m/min) | irradiation scan width (mm) | sheet supply speed (m/min) | preheated? | foaming temperature (°C) | foamed sheet exit speed (m/min) | thickness (mm) | density (kg/m3) | cross-linking degree (%) | DSC melting temperature (°C) |
|---|---|---|---|---|---|---|---|---|---|---|---|---|
| comparative example 3 | 800 | 65 | 20.1 | 1200 | 5.6 | yes | 229-232 | 16.5 | 3.2 | 49-53 | 38-42 | n/a |
| comparative example 4 | 800 | 65 | 20.1 | 1200 | 5.6 | yes | 229-233 | 17.7 | 3.0 | 48-52 | 33-37 | n/a |
| | 800 | 65 | 21.0 | 1200 | 6.5 | yes | 233-234 | 16.5 | 2.5 | 65-69 | 33-37 | |
| comparative example 5 | 800 | 65 | 22.2 | 1200 | 5.6 | yes | 224-231 | 17.2 | 3.4 | 48-52 | 34-38 | 140-142 |
| | 800 | 65 | 21.6 | 1200 | 6.5 | yes | 232-234 | 17.9 | 2.5 | 65-69 | 33-37 | |
| | 800 | 65 | 20.1 | 1200 | 6.0 | yes | 229-232 | 15.4 | 3.0 | 75-79 | 36-40 | |
| comparative example 6 | 800 | 65 | 22.2 | 1200 | 5.6 | yes | 225-233 | 19.6 | 3.3 | 32-36 | 33-37 | 119-121, 140-142 |
| comparative example 7 | 600 | 65 | 22.8 | 1200 | n/a | no | 228-234 | n/a | 1.9 | 114-118 | 37-41 | n/a |
| comparative example 8 | 600 | 65 | 22.8 | 1200 | n/a | no | 228-234 | n/a | 2.2 | 114-118 | 33-37 | n/a |
| comparative example 9 | 600 | 65 | 22.8 | 1200 | n/a | no | 228-234 | n/a | 2.6 | 62-66 | 35-39 | n/a |
| comparative example 10 | 800 | 65 | 20.1 | 1200 | 5.6 | yes | 229-232 | 16.7 | 3.1 | 49-53 | 35-39 | n/a |
| comparative example 11 | 800 | 65 | 22.8 | 1200 | 6.5 | yes | 233 | n/a | 2.3 | 68-72 | 39-43 | n/a |

| | Foamed Sheet Parameters | | | | | | | | | |
|---|---|---|---|---|---|---|---|---|---|---|
| example | compressive strength (kgf/cm2) | acceptable softness? | durometer (shore OO @ 15 sec) | haptic factor | acceptable haptic? | thermoforming ratios | acceptable moldability? | shrinkage @ 120°C (%) | shrinkage @ 140°C (%) | thermally stable? |
|---|---|---|---|---|---|---|---|---|---|---|
| comparative example 3 | 0.49 ± 10% | no | 62-64 | n/a | n/a | 125°C: 0.57-0.59, 170°C: 0.49-0.51, 210°C: 0.48-0.50 | yes | 3.2 ± 10% | n/a | n/a |
| comparative example 4 | 0.54 ± 10% | no | 66-68 | 2.7 ± 5% | no | n/a | yes | 7.9 ± 10% | n/a | no |
| | 0.72 ± 10% | no | 70-72 | 7.0 ± 5% | no | 130°C: 0.60-0.62, 170°C: 0.54-0.56, 190°C: 0.54-0.56 | yes | 4.6 ± 10% | 12.7 ± 10% | no |
| comparative example 5 | 0.39 ± 10% | yes | 54-56 | n/a | n/a | n/a | yes | 8.2 ± 10% | n/a | no |
| | 0.50 ± 10% | yes | 61-63 | 2.0 ± 5% | yes | 150°C: 0.62-0.64, 160°C: 0.68-0.70 | yes | 5.1 ± 10% | 13.5 ± 10% | no |
| | 0.57 ± 10% | yes | 63-65 | n/a | n/a | 170°C: 0.56-0.58, 200°C: 0.56-0.58 | yes | 7.9 ± 10% | n/a | no |
| comparative example 6 | 0.32 ± 10% | yes | 50-52 | 1.3 ± 5% | yes | n/a | yes | 5.2 ± 10% | 14.8 ± 10% | no |
| comparative example 7 | 0.60 ± 10% | yes | 68-70 | n/a | n/a | 110°C: 0.52-0.54, 130°C: 0.48-0.50, 150°C: 0.48-0.50, 160-210°C: <0.48 | yes | 10.3 ± 10% | n/a | no |
| comparative example 8 | 0.80 ± 10% | yes | 70-72 | n/a | n/a | 125-130°C: 0.68-0.70, 145-155°C: 0.60-0.62, 170°C: 0.56-0.58, 190-210°C: 0.52-0.54 | yes | 6 ± 10% | n/a | no |
| comparative example 9 | 0.38 ± 10% | yes | 52-54 | n/a | n/a | 110°C: 0.68-0.70, 130°C: 0.59-0.61, 150°C: 0.51-0.53, 170°C: 0.48-0.50, 190°C: 0.48-0.50, 210°C: 0.46-0.48 | yes | 4.1 ± 10% | n/a | n/a |
| comparative example 10 | 0.41 ± 10% | yes | 57-59 | n/a | n/a | 125°C: 0.57-0.59, 170°C: 0.52-0.54 | yes | 4.5 ± 10% | n/a | n/a |
| comparative example 11 | 1.11 ± 10% | no | n/a | n/a | n/a | n/a °C: >0.70 | yes | 1.4 ± 10% | n/a | n/a |

Table 4 shows the components, manufacturing parameters and properties for sheets comprising foam compositions made using olefin block copolymers having a controlled block sequence distribution (OBC) as a softening ingredient.

The foam compositions of Table 4 represent working examples of foam compositions in which all three desired physical properties (haptics, moldability and exceptional shear strength) are present.

TABLE 4

| | | | | Resins | | | | |
|---|---|---|---|---|---|---|---|---|
| example | resin type | form | manufacturer | commercial name | amount (%) | MFI (2.16 kg) | durometer hardness | DSC melting temperature peak (° C.) |
| example 1 | PP RCP | pulverized pellet | Sunoco Chemicals | TR3020F | 67 | 1.7-2.5 (230° C.) | n/a | 146-148 |
| | OBC | pulverized pellet | Dow Chemical Company | Infuse ™ OBC 9107 | 33 | 0.75-1.25 (190° C.) | 59-61 shore A | 120-122 |
| example 2 | PP RCP | pulverized pellet | Sunoco Chemicals | TR3020F | 60 | 1.7-2.5 (230° C.) | n/a | 146-148 |
| | OBC | pulverized pellet | Dow Chemical Company | Infuse ™ OBC 9107 | 40 | 0.75-1.25 (190° C.) | 59-61 shore A | 120-122 |

| | Additives | | | Blending Parameters | | | Extrusion Parameters | | | | |
|---|---|---|---|---|---|---|---|---|---|---|---|
| example | DVB crosslinker (PPHR) | ADCA blowing agent (PPHR) | antioxidant package (PPHR) | low speed blending (sec) | high speed blending (sec) | maximum blending temperature (° C.) | extrusion temperature (° C.) | extrusion rate (kg/hr) | extrusion die/resin pressure (psi) | extrusion thrust load (ton) | extrusion sheet thickness (mm) |
| example 1 | 3.95-4.05 | 6.45-6.55 | 4.95-5.05 ("PR023") | 30 | 530 | 68 | 160 | 190 | 1570 | 24.1 | 1.300 |
| example 2 | 3.95-4.05 | 6.45-6.55 | 4.95-5.05 ("PR023") | 30 | 530 | 67 | 160 | 190 | 1620 | 24.7 | 1.300 |

| | Irradiation Parameters | | | | Foaming Parameters | | | Foamed Sheet Parameters | | | |
|---|---|---|---|---|---|---|---|---|---|---|---|
| example | irradiation voltage (kV) | irradiation beam current (mA) | irradiation line speed (m/min) | irradiation scan width (mm) | foaming sheet supply speed (m/min) | preheated? | foaming temperature (° C.) | foamed sheet exit speed (m/min) | thickness (mm) | density (kg/m3) | crosslinking degree (%) | DSC melting temperature peaks (° C.) |
| example 1 | 700 | 65 | 14.4 | 1200 | 6.5 | no | 228-232 | 17.3 | 2.5 | 68-72 | 56-60 | 118-120, 144-146 |
| example 2 | 700 | 65 | 14.4 | 1200 | 6.5 | no | 228-232 | 16.9 | 2.5 | 66-70 | 55-59 | 119-121, 145-147 |

| | | | Foamed Sheet Parameters | | | | | | | |
|---|---|---|---|---|---|---|---|---|---|---|
| example | compressive strength (kgf/cm2) | improvement over comparative example 1 (%) | durometer (shore OO @ 15 sec) | haptic factor | thermoforming ratios | shrinkage @ 120° C., 60 minutes (%) | shrinkage @ 140° C., 10 minutes (%) | shrinkage @ 160° C., 10 minutes (%) | shear strength @ max load, room temp (kgf) | improvement over comparative example 1? (%) |
| example 1 | 0.83 ± 10% | +46.1 | 71-73 | 2.5 ± 5% | 155° C.: 0.58 | 1.6 ± 10% | 6.9 ± 10% | 28.6 ± 10% | 73.5 | −9.8 |
| example 2 | 0.77 ± 10% | +50.0 | 70-72 | 2.3 ± 5% | 170° C.: 0.58 | 1.9 ± 10% | 8.3 ± 10% | 28.1 ± 10% | 63.8 | −21.7 |

| | Foamed Sheet Parameters | | | | | | | | | |
|---|---|---|---|---|---|---|---|---|---|---|
| example | shear strength @ max load, 140° C. (kgf) | improvement over comparative example 1? (%) | shear strength @ max load, 150° C. (kgf) | improvement over comparative example 1? (%) | shear strength @ max load, 160° C. (kgf) | improvement over comparative example 1? (%) | shear strength @ max load, 170° C. (kgf) | improvement over comparative example 1? (%) | shear strength @ max load, 180° C. (kgf) | improvement over comparative example 1? (%) |
| example 1 | 16.4 | −6.8 | 12.5 | −22.4 | 10.9 | +18.5 | 6.8 | +38.8 | 3.9 | +116.7 |
| example 2 | 14.4 | −18.2 | 12.0 | −25.5 | 8.8 | −4.3 | 7.6 | +55.1 | 3.6 | +100.0 |

Table 5 shows the components, manufacturing parameters and properties for sheets comprising different foam compositions. The foam compositions of Table 5 represent comparative examples of foam compositions in which all three desired physical properties (haptics, moldability and exceptional shear strength) are not present.

TABLE 5

| example | resin type | form | manufacturer | commercial name | amount (%) | MFI (2.16 kg) | durometer hardness | DSC melting temperature peak (°C.) |
|---|---|---|---|---|---|---|---|---|
| comparative example 1 | PP RCP | pulverized pellet | Sunoco Chemicals | TR3020F | 67 | 1.7-2.5 (230° C.) | n/a | 146-148 |
|  | LLDPE | pulverized pellet | ExxonMobil Chemical Co. | LLP8501.67 | 33 | 5.9-7.5 (190° C.) | n/a | 125-127 |
| comparative example 2 | impact hPP | pulverized pellet | Sunoco Chemicals | TI4015F/ TI4015F2 | 40 | 1.4-2.0 (230° C.) | n/a | 166-168 |
|  | PP RCP | pulverized pellet | Sunoco Chemicals | TR3020F | 30 | 1.7-2.5 (230° C.) | n/a | 146-148 |
|  | LLDPE | pulverized pellet | ExxonMobil Chemical Co. | LLP8501.67 | 20 | 5.9-7.5 (190° C.) | n/a | 125-127 |
|  | CEBC | pellet | JSR Corporation | Dynaron 6200P | 10 | 1.0-5.0 (230° C.) | 65-67 shore A | 94-96 |
| comparative example 3 | PP RCP | pulverized pellet | Sunoco Chemicals | TR3020F | 60 | 1.7-2.5 (230° C.) | n/a | 146-148 |
|  | OBC | pulverized pellet | Dow Chemical Company | Infuse ™ OBC 9107 | 40 | 0.75-1.25 (190° C.) | 59-61 shore A | 120-122 |
| comparative example 4 | OBC | pellet | Dow Chemical Company | Infuse ™ OBC 9507 | 40 | 4.0-6.0 (190° C.) | 58-60 shore A | 122-124 |
|  | PP RCP | flake | Total Petrochemicals, USA | 7250FL | 30 | 1.3-1.6 (230° C.) | n/a | 137-139 |
|  | PP RCP | pulverized pellet | Sunoco Chemicals | TR3020F | 30 | 1.7-2.5 (230° C.) | n/a | 146-148 |
| comparative example 5 | POE | pellet | ExxonMobil Chemical Co. | Vistamaxx ™ 6102 | 30 | 1.5-4.5 (230° C.) | 66-68 shore A (15 sec) | amorphous |
|  | PP RCP | flake | Total Petrochemicals, USA | 7250FL | 25 | 1.3-1.6 (230° C.) | n/a | 137-139 |
|  | PP RCP | pulverized pellet | Sunoco Chemicals | TR3020F | 25 | 1.7-2.5 (230° C.) | n/a | 146-148 |
|  | LLDPE | pulverized pellet | ExxonMobil Chemical Co. | LLP8501.67 | 20 | 5.9-7.5 (190° C.) | n/a | 125-127 |
| comparative example 6 | PP RCP | flake | Total Petrochemicals, USA | 7250FL | 35 | 1.3-1.6 (230° C.) | n/a | 137-139 |
|  | PP RCP | pulverized pellet | Sunoco Chemicals | TR3020F | 35 | 1.7-2.5 (230° C.) | n/a | 146-148 |
|  | POE | pellet | ExxonMobil Chemical Co. | Vistamaxx ™ 6102 | 30 | 1.5-4.5 (230° C.) | 66-68 shore A (15 sec) | amorphous |

| example | DVB crosslinker (PPHR) | ADCA blowing agent (PPHR) | anti-oxidant package (PPHR) | low speed blending (sec) | high speed blending (sec) | maximum blending temperature (°C.) | extrusion temperature (°C.) | extrusion rate (kg/hr) | extrusion die/resin pressure (psi) | extrusion thrust load (ton) | extrusion sheet thickness (mm) |
|---|---|---|---|---|---|---|---|---|---|---|---|
| comparative example 1 | 3.53-3.63 | 6.53-6.63 | 4.95-5.05 ("PR023") | 30 | 530 | 68 | 168 | 240 | 1400 | 20.6 | 1.250 |
| comparative example 2 | 3.55-3.65 | 8.11-8.21 | 8.59-8.69 ("PR023") | 30 | 530 | 67 | 168 | 240 | 1450 | 21.6 | 1.000 |
| comparative example 3 | 3.95-4.05 | 6.45-6.55 | 4.95-5.05 ("PR023") | 30 | 530 | 67 | 160 | 190 | 1620 | 24.7 | 1.300 |
| comparative example 4 | 2.70-2.80 | 5.78-5.88 | 4.95-5.05 ("PR023") | 30 | 530 | 58 | 160 | 240 | 1410 | 20.8 | 1.400 |
| comparative example 5 | 2.70-2.80 | 5.78-5.88 | 4.95-5.05 ("PR023") | 60 | 470 | 59 | 160 | 200 | not recorded | 24.0 | 1.255 |
| comparative example 6 | 3.20-3.30 | 6.64-6.74 | 4.95-5.05 ("PR023") | 60 | 470 | 59 | 160 | 200 | not recorded | 25.4 | 1.255 |

TABLE 5-continued

| example | Irradiation Parameters | | | | Foaming Parameters | | | Foamed Sheet Parameters | | | |
|---|---|---|---|---|---|---|---|---|---|---|---|
| | irradiation voltage (kV) | irradiation beam current (mA) | irradiation line speed (m/min) | irradiation scan width (mm) | foaming sheet supply speed (m/min) | preheated? | foaming temperature (° C.) | foamed sheet exit speed (m/min) | thickness (mm) | density (kg/m3) | cross-linking degree (%) | DSC melting temperature peaks (° C.) |
| comparative example 1 | 600 | 62.5 | 13.0 | 1000 | 7.0 | yes | 233 | 18.3 | 2.5 | 65-69 | 53-57 | 121-123, 142-144 |
| comparative example 2 | 600 | 62.5 | 14.6 | 1000 | 7.1 | yes | 235 | 21.4 | 2.0 | 65-69 | 53-57 | 121-123, 156-158 |
| comparative example 3 | 700 | 65 | 19.2 | 1200 | 6.5 | no | 228-232 | 16.5 | 2.6 | 61-65 | 45-49 | 119-121, 145-147 |
| comparative example 4 | 800 | 65 | 19.2 | 1200 | 6.5 | no | 229-232 | 16.9 | 2.6 | 62-66 | 39-43 | not tested |
| comarative example 5 | 800 | 65 | 22.8 | 1200 | 6.5 | yes | 233 | not recorded | 2.3 | 68-72 | 35-39 | not tested |
| comparative example 6 | 800 | 65 | 22.8 | 1200 | 6.5 | yes | 233 | not recorded | 2.3 | 68-72 | 39-43 | not tested |

| | Foamed Sheet Parameters | | | | | | | | |
|---|---|---|---|---|---|---|---|---|---|
| example | compressive strength kgf/cm2 | improvement over comparative example 1 (%) | durometer (shore OO @ 15 sec) | haptic factor | thermoforming ratios | shrinkage @ 120° C., 60 minutes (%) | shrinkage @ 140° C., 10 minutes (%) | shrinkage @ 160° C., 10 minutes (%) | shear strength @ max load, room temp (kgf) |
| comparative example 1 | 1.54 ± 10% | — | 80-82 | 10.6 ± 10% | 155° C.: 0.58 | 2.0 ± 10% | 6.0 ± 10% | 30.4 ± 10% | 81.5 |
| comparative example 2 | 1.22 ± 10% | +20.8 | 76-78 | 5.5 ± 10% | 160° C.: 0.58 | 1.3 ± 10% | 2.7 ± 10% | 20.8 ± 10% | 76.8 |
| comparative example 3 | 0.70 ± 10% | +54.5 | 69-71 | 2.1 ± 5% | 165° C.: 0.70 | 1.4 ± 10% | 4.9 ± 10% | 21.3 ± 10% | 58.4 |
| comarative example 4 | 0.68 ± 10% | +55.8 | 70-72 | 2.4 ± 5% | 170° C.: 0.78-0.82 | 1.0 ± 10% | 4.5 ± 10% | 17.0 ± 10% | 47.7 |
| comparative example 5 | 0.86 ± 10% | +44.2 | 70-72 | 4.5 ± 10% | 165° C.: 0.86 | 2.3 ± 10% | 7.4 ± 10% | 18.0 ± 10% | 58.4 |
| comparative example 6 | 1.11 ± 10% | +27.9 | 73-75 | 7.5 ± 10% | 155° C.: ≥0.90 | 1.4 ± 10% | 3.4 ± 10% | 16.6 ± 10% | 62.2 |

| | Foamed Sheet Parameters | | | | | | | | | |
|---|---|---|---|---|---|---|---|---|---|---|
| example | improvement over comparative example 1? (%) | shear strength @ max load, 140° C. (kgf) | improvement over comparative example 1? (%) | shear strength @ max load, 150° C. (kgf) | improvement over comparative example 1? (%) | shear strength @ max load, 160° C. (kgf) | improvement over comparative example 1? (%) | shear strength @ max load, 170° C. (kgf) | improvement over comparative example 1? (%) | shear strength @ max load, 180° C. (kgf) | improvement over comparative example 1? (%) |
| comparative example 1 | — | 17.6 | — | 16.1 | — | 9.2 | — | 4.9 | — | 1.8 | — |
| comparative example 2 | −5.8 | 20.9 | +18.8 | 16.4 | +1.9 | 12.6 | +37.0 | 12.6 | +157.1 | 6.9 | +283.3 |
| comarative example 3 | −28.3 | 11.1 | −36.9 | 9.1 | −43.5 | 6.3 | −31.5 | 4.5 | −8.2 | 1.6 | −11.1 |
| comparative example 4 | −41.5 | 6.3 | −64.2 | 5.8 | −64.0 | 3.6 | −60.9 | 1.9 | −61.2 | 0.5 | −72.2 |
| comparative example 5 | −28.3 | 10.9 | −38.1 | 6.7 | −58.4 | 4.6 | −50.0 | 2.6 | −46.9 | 2.2 | +22.2 |
| comparative example 6 | −23.7 | 15.1 | −14.2 | 10.0 | −37.9 | 6.1 | −33.7 | 3.7 | −24.5 | 2.0 | +11.1 |

As discussed above, in many applications, it is desirable for a foam composition to be soft, to have a soft touch feel, to be moldable and to be thermally stable. As shown in Examples 1 to 5 of Table 1, foam compositions with desirable softness, haptics, moldability and thermal stability are attained by blending an olefin block copolymer having a controlled block sequence distribution with one or more polypropylene based polymers. These Examples also show that thermal stability at 120° C. and 140° C. is attained even when the melting temperature of the polypropylene based polymer(s) is relatively low (i.e., less than 150° C.).

In contrast, as shown in Comparative Examples 1 to 11 (Tables 2 and 3) foam compositions with desirable haptics, moldability and thermal stability are not attained when foam compositions are made using components, blending, extrusion, irradiation and foaming parameters different from those used to make the foam compositions of Examples 1-5 (Table 1).

As discussed above, in some applications, it is desirable for a foam composition to be soft, to be moldable and to have exceptional shear strength. As shown in Examples 1 and 2 of Table 4, foam compositions with desirable haptics, moldability and shear strength are attained by blending an olefin block copolymer having a controlled block sequence distribution with one or more polypropylene based polymers.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A foam composition comprising about 15 to about 75 parts by weight of an olefin block copolymer with a controlled block sequence having a melt flow index from about 0.1 to about 15 gram per 10 minutes at 190° C. and a melting temperature of at least about 115° C.; about 25 to about 85 parts by weight of at least one polypropylene based polymer having a melt flow index from about 0.1 to about 25 gram per 10 minutes at 230° C.; crosslinks to a crosslinking degree of about 20 to about 75%; and closed cells with at least 90% of the cells having undamaged cell walls; wherein the foam composition has a compressive strength and density selected from the group consisting of:
   a) a compressive strength of less than about 0.35 kg$_f$/cm$^2$ and a density of about 20 to about 40 kg/m$^3$;
   b) a compressive strength of less than about 0.51 kg$_f$/cm$^2$ and a density of about 40 to about 591 g/m$^3$;
   c) a compressive strength of less than about 0.66 kg$_f$/cm$^2$ and a density of about 60 to about 79 kg/m$^3$;
   d) a compressive strength of less than about 0.82 kg$_f$/cm$^2$ and a density of about 80 to about 99 kg/m$^3$; and
   e) a compressive strength of less than about 0.98 kg$_f$/cm$^2$ and a density of about 100 to about 119 kg/m$^3$, and
a haptic value of the foam composition is about 3.2 or less, wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin.

2. The foam composition of claim 1, wherein a thermoforming ratio of the foam composition is at least about 0.48 at a temperature in the range of about 100 to about 220° C.

3. The foam composition of claim 1, wherein shrinkage values of the foam composition after 1 hour at 120° C. is less than about 5% and the shrinkage values of the foam composition after 10 minutes at 140° C. is less than about 10%.

4. The foam composition of claim 1, wherein the polypropylene based polymer is selected from the group consisting of a polypropylene, impact modified polypropylene, polypropylene-ethylene copolymer, metallocene polypropylene, metallocene polypropylene-ethylene copolymer, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

5. The laminate composition comprising a layer of the foam composition of claim 1 and at least one layer selected from the group consisting of a film, a fabric, a fiber layer and a leather.

6. A foam composition comprising an olefin block copolymer with a controlled block sequence having a melt flow index of about 0.75 to about 6.0 grain per 10 minutes at 190° C. and a melting temperature of about 120 to about 124° C.; at least one polypropylene based polymer having a melt flow index of about 1.3 to about 2.5 gram per 10 minutes at 230° C. and a melting temperature of about 137 to about 168° C.; crosslinks formed from about 2.95 to about 3.63 parts per hundred units resin of divinylbenzene crosslinker to a crosslinking degree of about 29 to about 47%; and closed cells with at least 90% of the cells having undamaged cell walls; wherein the foam composition has a density of about 32 to about 83 kg/m$^3$, a compressive strength of about 0.27 to about 0.57 kg$_f$/cm$^2$, a durometer hardness of about 47 to about 64 Shore OO, a haptic factor of about 1.0 to about 3.2; a shrinkage value of about 1.7 to about 3.3% after 1 hour at 120° C., and a shrinkage value of about 3.4 to about 9.9% after 10 minutes at 140° C., wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin.

7. The foam composition of claim 6, wherein melting temperatures of the foam composition are about 121° C. to about 123° C. and about 139° C. to about 165° C.

8. The foam composition of claim 6, wherein thermoforming ratio is greater than about 0.90 at a temperature of 160° C. or a temperature of 170° C.

9. The foam composition of claim 6, wherein thermoforming ratio is about 0.78 to about 0.82 at a temperature of 170° C.

10. The foam composition of claim 6, wherein thermoforming ratio is about 0.68 to about 0.70 at a temperature of 160° C. or a temperature of 170° C.

11. The foam composition of claim 6, wherein thermoforming ratio is about 0.60 to about 0.62 at a temperature of 170° C. and about 0.56 to about 0.58 at a temperature of 180° C.

12. The foam composition of claim 6, wherein thermoforming ratio is about 0.82 at a temperature of 150° C. and about 0.70 at a temperature of 170° C.

13. The foam composition of claim 6, wherein thermoforming ratio is about 0.62 at a temperature of 175° C.

14. The foam composition of claim 6, further comprising azodicarbonamide or thermal decomposition products of azodicarbonamide.

15. The laminate composition comprising a layer of the foam composition of claim 6 and at least one layer selected from the group consisting of a film, a fabric, a fiber layer and a leather.

16. A foam composition comprising:
   A) about 15 to about 75 parts by weight of an olefin block copolymer with a controlled block sequence having a melt flow index from about 0.1 to about 15 gram per 10 minutes at 190° C. and a melting temperature of at least about 115° C.; about 25 to about 85 parts by weight of at least one polypropylene based polymer having a melt flow index from about 0.1 to about 25 gram per 10 minutes at 230° C.; crosslinks to a crosslinking degree of about 20 to about 75%; and closed cells with at least 90% of the cells having undamaged cell walls; wherein the foam composition has a compressive strength and density selected from the group consisting of:
      a) a compressive strength of less than about 0.35 kg$_f$/cm$^2$ and a density of about 20 to about 40 kg/m$^3$;
      b) a compressive strength of less than about 0.51 kg$_f$/cm$^2$ and a density of about 40 to about 59 kg/m$^3$;

c) a compressive strength of less than about 0.66 kg$_f$/cm$^2$ and a density of about 60 to about 79 kg/m$^3$;
d) a compressive strength of less than about 0.82 kg$_f$/cm$^2$ and a density of about 80 to about 99 kg/m$^3$; and
e) a compressive strength of less than about 0.98 kg$_f$/cm$^2$ and a density of about 100 to about 119 kg/m$^3$, and a haptic value of the foam composition is about 3.2 or less, wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin or B) an olefin block copolymer with a controlled block sequence having a melt flow index of about 0.75 to about 6.0 gram per 10 minutes at 190° C. and a melting temperature of about 120 to about 124° C.; at least one polypropylene based polymer having a melt flow index of about 1.3 to about 2.5 gram per 10 minutes at 230° C. and a melting temperature of about 137 to about 168° C.; crosslinks formed to a crosslinking degree of about 29 to about 47%; and closed cells with at least 90% of the cells having undamaged cell walls; wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin, wherein the foam composition has a density of about 32 to about 83 kg/m$^3$, a compressive strength of about 0.27 to about 0.57 kg$_f$/cm$^2$, a durometer hardness of about 47 to about 64 Shore OO, a haptic factor of about 1.0 to about 3.2; a shrinkage value of less than about 5% after 1 hour at 120° C., and a shrinkage value of less than about 10% after 10 minutes at 140° C.; made by a process comprising the steps of:
  a) blending a composition comprising (i) the olefin block copolymer with the controlled block sequence, (ii) the at least one polypropylene based polymer, (iii) a crosslinking monomer and (iv) a chemical blowing agent to produce a blended composition;
  b) crosslinking the blended composition to obtain a crosslinked composition; and
  c) foaming the crosslinked composition at an elevated temperature to obtain the foam composition.

17. The foam composition of claim 16, wherein thermoforming ratio of the foam composition is at least about 0.48 at a temperature in the range of about 100 to about 220° C.

18. The foam composition of claim 16, wherein shrinkage value of the foam composition after 1 hour at 120° C. is 1.7 to about 3.3% and the shrinkage value of the foam composition after 10 minutes at 140° C. of 3.4 to about 9.9%.

19. The foam composition of claim 16, wherein the polypropylene based polymer is selected from the group consisting of a polypropylene, impact modified polypropylene, polypropylene-ethylene copolymer, metallocene polypropylene, metallocene polypropylene-ethylene copolymer, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

20. The foam composition of claim 16, wherein the process further comprises the step of extruding the blended composition.

21. The foam composition of claim 16, wherein the chemical blowing agent is azodicarbonamide.

22. The foam composition of claim 16, wherein the crosslinking monomer is divinylbenzene.

23. A foam composition comprising about 15 to about 50 parts by weight of an olefin block copolymer with a controlled block sequence having a melt flow index from about 0.1 to about 15 gram per 10 minutes at 190° C. and a melting temperature of at least about 115° C.; about 50 to about 85 parts by weight of at least one polypropylene based polymer having a melt flow index from about 0.1 to about 25 gram per 10 minutes at 230° C.; crosslinks to a crosslinking degree of about 45 to about 75%; and closed cells with at least 90% of the cells having undamaged cell walls; wherein the foam composition has a compressive strength and density selected from the group consisting of:
  a) a compressive strength of less than about 0.46 kg$_f$/cm$^2$ and a density of about 20 to about 40 kg/m$^3$;
  b) a compressive strength of less than about 0.76 kg$_f$/cm$^2$ and a density of about 40 to about 59 kg/m$^3$;
  c) a compressive strength of less than about 1.07 kg$_f$/cm$^2$ and a density of about 60 to about 79 kg/m$^3$;
  d) a compressive strength of less than about 1.38 kg$_f$/cm$^2$ and a density of about 80 to about 99 kg/m$^3$; and
  e) a compressive strength of less than about 1.68 kg$_f$/cm$^2$ and a density of about 100 to about 119 kg/m$^3$, and a haptic value of the foam composition is about 3.2 or less, wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin.

24. The foam composition of claim 23, wherein thermoforming ratio of the foam composition is at least about 0.48 at a temperature in the range of about 100 to about 220° C.

25. The foam composition of claim 23, wherein shrinkage values of the foam composition after 1 hour at 120° C. is less than about 5% and the shrinkage values of the foam composition after 10 minutes at 140° C. is less than about 10%.

26. The foam composition of claim 23, wherein shear strength of the foam composition is at least one selected from the group consisting of:
  a) greater than about 50 kg$_f$ at a temperature in the range of about 60 to about 80° C.;
  b) greater than about 11 kg$_f$ when measured at 140° C.;
  c) greater than about 9 kg$_f$ when measured at 150° C.;
  d) greater than about 6 kg$_f$ when measured at 160° C.;
  e) greater than about 4 kg$_f$ when measured at 170° C.;
  f) greater than about 2 kg$_f$ when measured at 180° C.; and
  g) about 2 kg$_f$ to about 50 kg$_f$ at a temperature in the range of about 60 to about 180° C.

27. The foam composition of claim 23, wherein the polypropylene based polymer is selected from the group consisting of a polypropylene, impact modified polypropylene, polypropylene-ethylene copolymer, metallocene polypropylene, metallocene polypropylene-ethylene copolymer, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

28. The laminate composition comprising a layer of the foam composition of claim 23 and at least one layer selected from the group consisting of a film, a fabric, a fiber layer and a leather.

29. A foam composition comprising an olefin block copolymer with a controlled block sequence having a melt flow index of about 0.75 to about 1.25 gram per 10 minutes at 190° C. and a melting temperature of about 120 to about 122° C.; at least one polypropylene based polymer having a melt flow index of about 1.7 to about 2.5 gram per 10 minutes at 230° C. and a melting temperature of about 146 to about 148° C.; crosslinks formed from about 3.95 to about 4.05 parts per hundred units resin of divinylbenzene crosslinker to a crosslinking degree of about 55 to about 60%; and closed cells with at least 90% of the cells having undamaged cell walls; wherein the foam composition has a density of about 66 to about 72 kg/m$^3$, a compressive strength of about 0.77 to about 0.83 kg$_f$/cm$^2$, a durometer hardness of about 70 to about 73 Shore OO, a haptic factor of about 2.3 to about 2.5; a shrinkage value of about 1.6 to about 1.9% after 1 hour at 120° C., a shrinkage value of about 6.9 to about 8.3% after 10 minutes at 140° C., a shrinkage value of about 28.1 to about 28.6% after 10 minutes at 160° C., a shear strength of about 63.8 to about 73.5 kg$_f$ at about 60 to about 80° C., a shear strength of about 14.4 to about 16.4 kg$_f$ at 140° C., a shear strength of about 12.0 to about 12.5 kg$_f$ at 150° C., a shear strength of about 8.8 to about 10.9 kg$_f$ at 160° C., a shear strength of about 6.8 to about 7.6 kg$_f$ at 170° C. and a shear strength of about 3.6 to about 3.9 kg$_f$ at 180° C., wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin.

30. The foam composition of claim 29, wherein melting temperatures of the foam composition are about 118° C. to about 121° C. and about 144° C. to about 147° C.

31. The foam composition of claim 29, wherein thermoforming ratio is about 0.58 at a temperature of 155° C. or a temperature of 170° C.

32. The foam composition of claim 29, further comprising azodicarbonamide or thermal decomposition products of azodicarbonamide.

33. The laminate composition comprising a first layer of the foam composition of claim 29 and a second layer selected from the group consisting of a film, a fabric, a fiber layer and a leather.

34. A foam composition comprising A) about 15 to about 50 parts by weight of an olefin block copolymer with a controlled block sequence having a melt flow index from about 0.1 to about 15 gram per 10 minutes at 190° C. and a melting temperature of at least about 115° C.; about 50 to about 85 parts by weight of at least one polypropylene based polymer having a melt flow index from about 0.1 to about 25 gram per 10 minutes at 230° C.; crosslinks to a crosslinking degree of about 45 to about 75%; and closed cells with at least 90% of the cells having undamaged cell walls; wherein the foam composition has a compressive strength and density selected from the group consisting of:
   a) a compressive strength of less than about 0.46 kg$_f$/cm$^2$ and a density of about 20 to about 40 kg/m$^3$;
   b) a compressive strength of less than about 0.76 kg$_f$/cm$^2$ and a density of about 40 to about 59 kg/m$^3$;
   c) a compressive strength of less than about 1.07 kg$_f$/cm$^2$ and a density of about 60 to about 79 kg/m$^3$;
   d) a compressive strength of less than about 1.38 kg$_f$/cm$^2$ and a density of about 80 to about 99 kg/m$^3$; and
   e) a compressive strength of less than about 1.68 kg$_f$/cm$^2$ and a density of about 100 to about 119 kg/m$^3$, and
a haptic value of the foam composition is about 3.2 or less, wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin or B) an olefin block copolymer with a controlled block sequence having a melt flow index of about 0.75 to about 1.25 gram per 10 minutes at 190° C. and a melting temperature of about 120 to about 122° C.; at least one polypropylene based polymer having a melt flow index of about 1.7 to about 2.5 gram per 10 minutes at 230° C. and a melting temperature of about 146 to about 148° C.; crosslinks formed to a crosslinking degree of about 55 to about 60%; and closed cells with at least 90% of the cells having undamaged cell walls; wherein the foam composition has a density of about 66 to about 72 kg/m$^3$, a compressive strength of about 0.77 to about 0.83 kg$_f$/cm$^2$, a durometer hardness of about 70 to about 73 Shore OO, a haptic factor of about 2.3 to about 2.5; a shrinkage value of less than about 5% after 1 hour at 120° C., a shrinkage value of less than about 10% after 10 minutes at 140° C., a shrinkage value of about 28.1 to about 28.6% after 10 minutes at 160° C., a shear strength of about 63.8 to about 73.5 kg$_f$ at about 60 to about 80° C., a at 180° C., made by a process comprising the steps of:
   a) blending a composition comprising (i) the olefin block copolymer with a controlled block sequence, (ii) the at least one polypropylene based polymer, (iii) a crosslinking monomer and (iv) a chemical blowing agent to produce a blended composition;
   b) crosslinking the blended composition to obtain a crosslinked composition; and
   c) foaming the crosslinked composition at an elevated temperature to obtain the foam composition,
wherein the olefin block copolymer with a controlled block sequence is a polydisperse multi-block copolymer comprising a block of crystallizable ethylene-α-olefin with a density and an α-olefin co-monomer content, alternating with a block of amorphous ethylene-α-olefin having a density lower than the density of the block of crystallizable ethylene-α-olefin and a co-monomer content higher than the block of crystallizable ethylene-α-olefin.

35. The foam composition of claim 34, wherein thermoforming ratio of the foam composition is at least about 0.48 at a temperature in the range of about 100 to about 220° C.

36. The foam composition of claim 34, wherein shrinkage value of the foam composition after 1 hour at 120° C. is 1.6 to about 1.9% and the shrinkage value of the foam composition after 10 minutes at 140° C. is 6.9 to about 8.3%.

37. The foam composition of claim 34, wherein shear strength of the foam composition is at least one selected from the group consisting of:
   a) greater than about 50 kg$_f$ at a temperature in the range of about 60 to about 80° C.;
   b) greater than about 11 kg$_f$ when measured at 140° C.;
   c) greater than about 9 kg$_f$ when measured at 150° C.;
   d) greater than about 6 kg$_f$ when measured at 160° C.;
   e) greater than about 4 kg$_f$ when measured at 170° C.;
   f) greater than about 2 kg$_f$ when measured at 180° C.; and g) about 2 kg$_f$ to about 50 kg$_f$ at a temperature in the range of about 60 to about 180° C.

38. The foam composition of claim 34, wherein the polypropylene based polymer is selected from the group consisting of a polypropylene, impact modified polypropylene, polypropylene-ethylene copolymer, metallocene polypropylene, metallocene polypropylene-ethylene copolymer, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

39. The foam composition of claim 34, wherein the process further comprises the step of extruding the blended composition.

40. The foam composition of claim 34, wherein the chemical blowing agent is azodicarbonamide.

41. The foam composition of claim 34, wherein the crosslinking monomer is divinylbenzene.

\* \* \* \* \*